US010013854B2

(12) United States Patent
Elias et al.

(10) Patent No.: US 10,013,854 B2
(45) Date of Patent: Jul. 3, 2018

(54) BINGO GAME SERVERS, CONTROLLERS, BROADCASTERS, AND SYSTEMS

(71) Applicant: Gamesys Ltd., London (GB)

(72) Inventors: Hans Elias, St. Albans (GB); Adam Scott, Addlestone (GB)

(73) Assignee: Gamesys Ltd., London (GB)

( * ) Notice: Subject to any disclaimer, the term of this patent is extended or adjusted under 35 U.S.C. 154(b) by 644 days.

(21) Appl. No.: 14/606,936

(22) Filed: Jan. 27, 2015

(65) Prior Publication Data

US 2015/0213672 A1 Jul. 30, 2015

Related U.S. Application Data

(60) Provisional application No. 61/931,724, filed on Jan. 27, 2014.

(51) Int. Cl.
*A63F 13/30* (2014.01)
*G07F 17/32* (2006.01)

(52) U.S. Cl.
CPC ........ *G07F 17/329* (2013.01); *G07F 17/3225* (2013.01); *G07F 17/3267* (2013.01)

(58) Field of Classification Search
CPC . G07F 17/329; G07F 17/3225; G07F 17/3267
USPC ........................................................... 463/19
See application file for complete search history.

(56) References Cited

U.S. PATENT DOCUMENTS

| | | | | |
|---|---|---|---|---|
| 5,647,798 | A * | 7/1997 | Falciglia | G07F 17/34 273/138.2 |
| 7,591,722 | B2 | 9/2009 | Baerlocher et al. | |
| 8,118,666 | B2 | 2/2012 | Nicely et al. | |
| 2006/0035700 | A1* | 2/2006 | Van Asdale | G07F 17/32 463/19 |
| 2012/0184346 | A1 | 7/2012 | Kepler et al. | |
| 2013/0023324 | A1 | 1/2013 | Lange | |
| 2013/0296060 | A1 | 7/2013 | Hayden et al. | |

OTHER PUBLICATIONS

Written Opinion for PCT/US2015/012972 dated May 4, 2015; 23 pps.
International Search Report for PCT/US2015/012972 dated May 4, 2015; 2 pps.

* cited by examiner

*Primary Examiner* — Allen Chan
(74) *Attorney, Agent, or Firm* — Michael D. Downs; Fincham Downs LLC

(57) ABSTRACT

A bingo game system provides for new features and functionality for a bingo game platform, including a bingo broadcaster in communication with a bingo game server, at least one desktop client device, and at least one mobile client device (e.g., via a bingo connection proxy).

19 Claims, 13 Drawing Sheets

BINGO GAME SERVERS, CONTROLLERS, BROADCASTERS, AND SYSTEMS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The present application claims the benefit of priority of U.S. Provisional Patent Application No. 61/931,724 filed Jan. 27, 2014, entitled "SYSTEMS, APPARATUS AND METHODS FOR BINGO GAMES HAVING SPECIAL PLAYER NUMBERS," which is incorporated by reference in the present application.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
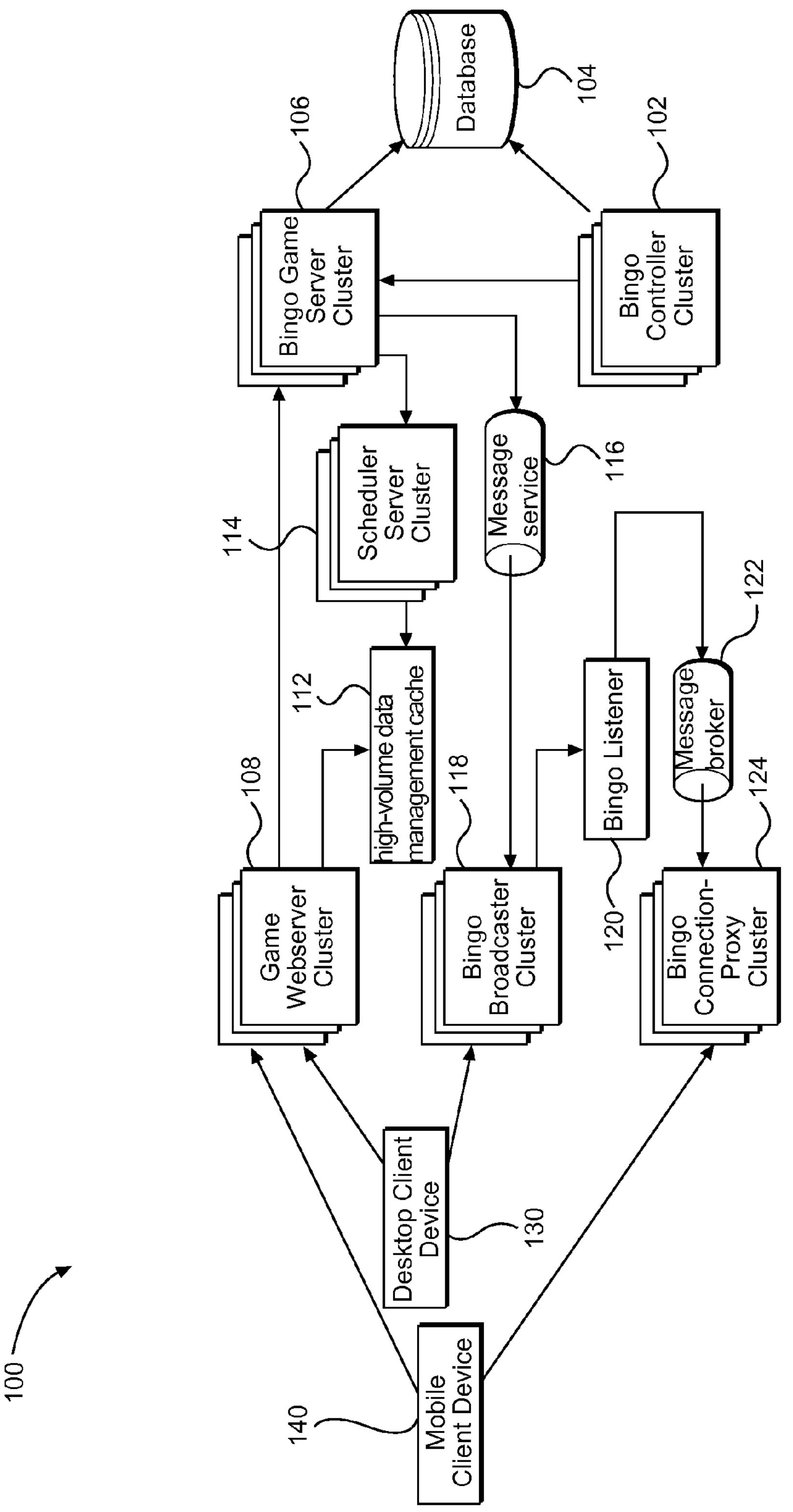
FIG. 1 is a block diagram of a bingo system according to one or more embodiments.

Some embodiments presented in this disclosure are descriptive of systems for providing bingo game play, comprising: (i) a bingo game server in communication with a player interface, a memory device, and/or a cloud-based cache; (ii) a bingo controller in communication with the bingo game server and with the memory device; (iii) a game webserver in communication with the bingo game server (and/or with a cloud-based cache); and (iv) a bingo broadcaster in communication with the bingo game sever and the player interface via a bingo listener (e.g., Java™-based message service component), a message broker, and a bingo connection proxy.

Some embodiments presented in this disclosure are descriptive of systems, apparatus, methods, and articles of manufacture for new features and functionality of bingo games. Although some embodiments may be discussed in this disclosure, by means of example and for convenience of illustration only, in the context of a 90-ball bingo game, it will be readily understood that such embodiments may be adapted and/or implemented with respect to one or more other types of bingo games (e.g., 75-ball bingo, 80 ball bingo), as deemed desirable for a particular implementation. A bingo game in accordance with one or more embodiments described in this disclosure may be implemented, for example and without limitation, as an online game, offline game, wagering game, non-wagering game, and/or social network game.

Inventors have recognized that some types of game providers and players may find it beneficial to provide for game play that leverages player superstition and players' perceptions of "luck."

According to some embodiments, a bingo game provides for the use of one or more particular numbers associated with a player of a bingo player (e.g., one or more numbers selected by a player as special or "lucky" numbers) to create multiple positions associated with the special number (or numbers) on a bingo ticket, card or other type of bingo game area. In accordance with some embodiments, any of the special positions corresponding to the same special number (e.g., a player's lucky number) may be marked off simultaneously when that number is called during play of the bingo game. In accordance with some embodiments, when a lucky number associated with a player is called during play, all of the positions of a bingo ticket associated with that lucky number may be marked off or daubed simultaneously (e.g., by a player and/or automatically).

Inventors have recognized that it may be beneficial to some types of game providers and players to create a bingo experience where additional win opportunities are generated through the chance of multiple instances of one or more predetermined numbers (and/or positions corresponding to those numbers) being marked off in response to or following the predetermined special number(s) being called for a bingo ticket.

According to one or more embodiments, methods are provided that allow for a player to select or otherwise be associated with a bingo number that is a special number (also referred to as a "lucky number" in this disclosure) for the player in a bingo game. In some embodiments, a player may select one or more lucky numbers prior to and/or concurrently with purchase of one or more bingo tickets and/or at a start of a bingo game. According to one embodiment, any selected lucky numbers may apply for all of the player's tickets for a particular bingo game and/or bingo game session. In one embodiment, one or more lucky numbers may be assigned (e.g., by a game processor) to a player.

In some embodiments, a bingo ticket or card may be generated and/or displayed having one or more positions marked based on the player's lucky number. For example, a bingo ticket may be generated having one, two, or more positions displaying a player's lucky number (e.g., "8"). In one embodiment, marking a position of a bingo ticket with a lucky number comprises displaying a ticket with at least two instances of the number.

According to some embodiments, play of a bingo game may comprise determining a number of special positions to associate, on a bingo ticket or other bingo game space, with a player's special number(s). According to some embodiments, the number of positions that are marked on a bingo ticket with a player's lucky number may be determined based on, for example and without limitation, how many tickets the player purchases, the outcome of one or more previous games (e.g., all players that got close to winning get an extra lucky number position), and/or some other game element (e.g., a random pick before the bingo game starts but after tickets have been purchased). In one or more embodiments, the number of positions marked based on a selected lucky number could be tied to a value-based parameter (e.g., associated with a player in a database of player information and/or game information) such as a number of tickets bought, a score derived from a previous game, and/or a measurement of player value.

According to some embodiments, generating at least one position marked based on the player's lucky number may comprise determining one or more weighted random arrays. In one example, a first weighted random array may be used to determine the total number of positions that will be marked based on a special number associated with a player. Similarly, a second weighted random array may be used to determine how the number of special positions are to be distributed on one or more bingo tickets and/or one or more lines of a bingo ticket (e.g., the number of special positions generated on a given line of a bingo ticket). The more positions that are marked on a given line, the greater the likelihood of a one line or two line win for that ticket (e.g., in a 90-ball bingo game). In accordance with some embodiments, the more positions that are marked as "lucky," the shorter the game play will tend to be.

According to some embodiments, one or more additional prizes may be offered to a player if the player wins the game with his lucky number. For example, an additional or bonus prize may be provided to a player if the player completes one or more lines, fills a ticket, and/or fills all tickets, or otherwise satisfies a win condition, where the final ball that completes the win condition is his lucky number.

Throughout this description unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "game," as the term is used in this disclosure (unless specified otherwise), may generally comprise any game (e.g., wagering or non-wagering, electronically playable over a network) playable by one or more players in accordance with specified rules. A game may be playable on a personal computer (PC) online in web browsers, on a game console and/or on a mobile device such as a smart-phone or tablet computer. "Gaming" thus generally refers to play of a game.

A "casual game," as the term is utilized in this disclosure (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game," as used in this disclosure (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but may also be implemented on other platforms such as mobile devices.

A "wagering game," as the term is used in this disclosure (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider," as used in this disclosure (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized in this disclosure, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described in this disclosure are associated with a "player device" or a "network device." As used in this disclosure, a "player device" is a subset of a "network device." The "network device," for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used in this disclosure, the term "network component" may refer to a player or network device, or a component, piece, portion, or combination of player or network devices. Examples of network components may include a static random access memory (SRAM) device or module, a network processor, and a network communication path, connection, port, or cable.

In addition, some embodiments are associated with a "network" or a "communication network." As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a local area network (LAN), a wide area network (WAN), a cellular telephone network, a Bluetooth® network, a near-field communication (NFC) network, a radio frequency (RF) network, a virtual private network (VPN), Ethernet (or IEEE 802.3), token ring, or via any appropriate communications means or combination of communications means. Exemplary protocols include but are not limited to: Bluetooth™, time division multiple access (TDMA), code division multiple access (CDMA), global system for mobile communications (GSM), enhanced data rates for GSM evolution (EDGE), general packet radio service (GPRS), wideband CDMA (WCDMA), advanced mobile phone system (AMPS), digital AMPS (D-AMPS), IEEE 802.11 (WI-FI), IEEE 802.3, SAP, the best of breed (BOB), and/or system to system (S2S).

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication," as used in this disclosure (unless specified otherwise), may generally refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used in this disclosure (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used in this disclosure, the terms "outcome" and "result" should be differentiated in the present description in that an "outcome" is generally a representation of a "result," typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described in this disclosure encompass awards, prizes, and payouts which are monetary, non-monetary, tangible, or intangible.

As used in this disclosure, the term "virtual currency" may generally refer to an in-game currency that may be used as part of a game or one or more games provided by a game provider as (i) currency for making wagers, and/or (ii) to purchase or access various in-game items, features, or powers.

A "credit balance", as the term is used in this disclosure (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

Some embodiments are descriptive of an "array" or "matrix" of symbols or game outcomes. As utilized in this disclosure, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., bingo tickets, slot reel symbols, and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

Some embodiments of this disclosure relate to bingo games and/or computer software applications for providing bingo games. Some embodiments of this disclosure relate to gaming networks for providing bingo games, including social network games, single player games and/or multi-player games.

According to some embodiments, a bingo game is provided in which a player uses one or more cards (or tickets, or other type of physical or electronic game play area or game space) that include symbols (e.g., alphanumeric characters and/or other types of identifiers) assigned to respective spaces or other designated areas on the card. One or more symbols are drawn, selected, or otherwise determined from a set of symbols available for the bingo game, and, in accordance with some embodiments, the drawn symbols are compared to the symbols designated on the card to see if there are any matches. It will be readily understood that a set of symbols for a bingo game may include any range of numbers, multiple ranges of numbers, a non-sequential range of numbers, alphanumeric characters, non-numeric symbols, letters, punctuation marks, and/or any other representation of information.

According to some embodiments, for a given bingo game, the distribution of bingo symbols across cards, and/or the distribution of the tickets across players, may be in accordance with one or more distribution algorithms and/or at random. In some embodiments, a bingo system generates all possible combinations of available bingo symbols as cards, and distributes all of the possible cards before distributing any repeat cards.

According to some embodiments, if marked (or "daubed") spaces on a card form one or more previously designated arrangements (a "bingo pattern" or "winning pattern"), the card may be deemed a winning card and/or the player may be eligible for a prize. In one example, a player may win a prize by calling "Bingo" for a card with a winning pattern (e.g., by clicking a "Bingo" button of a game interface to indicate the player thinks his electronic bingo card includes a winning bingo pattern). "Daubed" or "marked" will be used synonymously in this disclosure to refer to spaces, symbols, numbers, etc., on a card that have been marked, covered, stamped, daubed, highlighted, or otherwise identified physically, visually, and/or graphically, as potentially contributing to a winning pattern (e.g., alone or in combination with one or more other marked spaces). In some embodiments, spaces are daubed (e.g., automatically by a gaming device and/or manually by a player) if they match symbols drawn for a bingo game. Alternatively, or in addition, one or more spaces may be daubed without requiring that the space match a drawn symbol (a "free" daub or mark). For example, a card may have one or more free daubs automatically prior to the start of play (e.g., the center square of a 5×5 grid may be pre-marked with a free daub) and/or anytime during play (e.g., by receiving a free random daub in accordance with a game rule).

According to one embodiment, a card includes spaces arranged in columns and rows (e.g., a 5×5 grid of spaces, a 3×4 array of ticket lines), each having a designated number (e.g., selected from a set of bingo numbers 1-75) represented in a respective space on the card.

According to one embodiment, the card may include one or more types of location identifiers. Location identifiers may include, without limitation, one or more column identifiers, row identifiers, and/or other types of identifiers that uniquely identify a particular grid space, row, column, area, or other portion of a bingo card. For example, each column of a 5×5 bingo card may be identified respectively as "B," "I," "N," "G," or "O."

According to some embodiments, each symbol for a bingo game may be associated with one or more respective location identifiers. In one embodiment, certain symbols may be designated only in certain areas of a game card. For example, the "B" column of a 5×5 card may only include numbers selected in the range of 1-15. In another example, the first column of a 90-ball bingo game ticket may only include numbers selected in the range of 1-10, the second column may only include numbers selected in the range of 11-20, and so on. Accordingly, in some embodiments, a given bingo symbol may be associated with both a number (or a shape, color, or other type of symbol identifier that distinguishes it from other symbols) and location information (e.g., a column identifier, row identifier, and/or other type of location identifier) including information about where the symbol may appear on the card. In one example, a bingo ball may be associated with the number "3" and with a "B," indicating that if it appears on a card it would appear in a designated "B" column of spaces.

According to some embodiments, symbols may be represented (e.g., physically or electronically via a user interface) as numbered balls. Drawn numbers themselves may be referred to in this disclosure as "balls" for illustrative purposes and without limitation. As used in this disclosure, a "symbol draw" or "ball draw" may be used to refer to a process for selecting or otherwise determining (e.g., at random) numbers or other types of symbols drawn for use in comparing to symbols on a card for a bingo game. "Drawn balls" and "drawn numbers" may be used for convenience to refer to symbols selected in a symbol draw, and it will be understood that such terms are not limited to balls or numbers, but encompass any type of symbols drawn for a bingo game. Those of skill in the art will realize that the symbols used in an electronic bingo game may be displayed in any convenient fashion as deemed appropriate for a particular implementation, and that a simulated ball draw is merely one example. The number of balls drawn and the timing of ball draws may vary according to the desired type of bingo game.

According to some embodiments, a bingo game is played until at least one predetermined winning pattern is established on a bingo card. In some embodiments, determining whether a winning pattern is marked properly on a card may comprise determining whether each marked space may be compared to a set of drawn symbols to verify that it is a valid mark and therefore may qualify for or contribute to a winning pattern. In another example, determining if a marked pattern is a winning pattern may comprise determining whether any marked spaces are valid free daubs. According to some embodiments, a bingo game is played until a predetermined number of winning patterns are achieved (e.g., by one or more players) and/or until a time limit expires.

According to some embodiments, a player must identify any matches between drawn numbers and numbers designated on the player's card(s), the player must take action to daub spaces on the card (e.g., via a user interface) in order to form potential winning patterns, and/or the player must take action to declare a card has one or more winning patterns (e.g., by clicking a "Bingo" button). In one embodiment, one or more daubed spaces may be undaubed by a player and/or bingo game program. In one example, a player may undaub a space that the player mistakenly daubed. In some embodiments, one or more matching numbers may be daubed automatically and/or one or more winning patterns of marked spaces may be identified automatically (e.g., electronically by gaming device in accordance with instructions of a computer software program). Some embodiments may provide for automatic daubing of one or more spaces (e.g., for initial free daubs and/or random free daubs during play) and for manual daubing by the player of one or more spaces (e.g., in response to matching drawn numbers).

A. Systems

Referring now to FIG. 1, a block diagram of a bingo game bingo game system 100 according to some embodiments is shown. In some embodiments, the bingo game system 100 may comprise a bingo gaming platform such as a bingo game platform via which social, multiplayer, and/or online bingo games may be played (e.g., one or more bingo games as described in this disclosure, among others). In some embodiments, the bingo game system 100 may comprise a plurality of client or player devices, such as, for example, a mobile client device 140 and/or a desktop client device 130. Players, for example, may use these player devices to access bingo play via the bingo game system 100. For example, the mobile client device 140 may communicate with a game webserver cluster 108 and a bingo connection proxy cluster 124. In another example, the desktop client device 140 may communicate with a game webserver cluster 108 and a bingo broadcaster cluster 118. It will be readily understood that although when describing some embodiments reference may be made to a "cluster" of devices, embodiments of the present invention are not limited to only a plurality of such devices. Some embodiments may comprise only one of any given type of device.

In some embodiments, the game webserver cluster 108 may act as an interface between a plurality of players and at least one bingo server. In one or more embodiments, the game webserver cluster 108 provides log in functionality, website navigation, game lobby functionality, and/or game user interface (UI) assets. In one embodiment, the game webserver cluster 108 receives a player request to purchase one or more bingo games, and passes such purchase requests to a bingo game server (e.g., of bingo game server cluster 106).

In some embodiments, to aid with speed and responsiveness and the ability to scale as use fluctuates, even with respect to large amounts of data and/or a high volume of data requests, data collected by the game webserver cluster 108 may be cached using a high-volume data management cache 112 (e.g., BigMemory™ in-memory, data management service by Terracotta).

In one or more embodiments, the game webserver cluster 108 may communicate with the bingo game server cluster 106, comprising one or more specialized bingo game servers. A bingo game server of bingo game server cluster 106, in accordance with one embodiment of the present invention, may store logic enabling the purchase of bingo games and/or the management of bingo game play. A specialized bingo game server in accordance with some embodiments of the present invention may, for example, be specially configured to generate one or more special player numbers, in addition to being configured to generate one or more bingo number calls, to generate one or more (conventional) player ticket numbers, to determine one or more winners of a bingo game, and/or to determine a distribution of prizes. Other examples of processes that may be performed by a bingo game server of bingo game server cluster 106 (directly or indirectly) may include, but are not limited to: (i) determining a set of available numbers and/or other types of bingo symbols for a bingo game; (ii) conducting a symbol draw or otherwise determining or selecting (e.g., at random) which symbols, of a plurality of bingo symbols available (e.g., depending on the type of bingo game), are drawn for a particular round of a bingo game; (iii) transmitting an indication of at least one drawn symbol to a player device; (iv) determining one or more drawn symbols that are in play for a bingo game (e.g., that previously may have been visible and/or queued but not yet available for play); (v) transmitting an indication of at least one drawn and queued symbol to a player device; (vi) determining and/or transmitting (e.g., to a player device) one or more cards, tickets, or other type of bingo game space for a bingo game; (vii) determining one or more players of a bingo game; (viii) determining and/or establishing at least one winning pattern for a bingo game; (ix) determining at least one bingo card having at least one valid winning pattern (e.g., of daubed spaces); (x) determining an outcome of a bingo game; (xi) transmitting an indication of an outcome of a bingo game to a player device; (xii) determining one or more drawn symbols that are queued to be enabled for play in a bingo game (e.g., but are not yet available for play); (xiii) determining one or more drawn symbols for which respective visual representations are (or are to be) made visible to one or more players; (xiv) authorizing a game program to be downloaded to a player device; and/or (xv) modifying (and/or directing a player device to modify) a game interface (e.g., to provide for electronic gaming).

According to some embodiments, a bingo game server of bingo game server cluster 106 may store game data in a database 104, and may transmit game data to a bingo broadcaster cluster 118 via message service 116. In some embodiments, message service 116 may comprise a scalable, asynchronous message service such as a Java™ message service (JMS) (e.g., JBoss® A-MQ by Red Hat or ActiveMQ™ by Apache).

The database 104 may store, for example, game data (e.g., processed and/or defined by a specially-programmed bingo game server of bingo game server cluster 106), data associated with players (e.g., players interacting with the bingo game servers via a mobile client device 140 and/or a desktop client device 130), and/or specialized instructions that cause various devices (e.g., of the bingo game server 106, scheduler server cluster 114, game webserver cluster 108, bingo broadcaster cluster 118, bingo controller cluster 102, bingo connection proxy cluster 124, the devices 130, and/or the devices 140) to operate in accordance with embodiments described in this disclosure.

A bingo game server in accordance with some embodiments of the present invention and/or one or more of the devices 130, 140, stores and/or has access to data useful for facilitating play of a bingo game. For example, a bingo game server and/or the mobile client device 140 may store (i) one or more probability databases for determining one or more outcome(s) for a game, (ii) a current state or status of a game or game session, (iii) one or more user interfaces for use in a game, (iv) one or more game themes for a game and/or (v) profiles or other personal information associated with a player of a game. It should be noted that in some embodiments such data may be stored on the bingo game server and information based on such data may be output to a player's device during play of a game, while in other embodiments a game program may be downloaded to a local memory of a player's device and thus such data may be stored on a player's device (e.g., in encrypted or other secure or tamper-resistant form).

According to some embodiments, any or all of the components of example bingo game system 100 may conduct (in whole or in part), facilitate, and/or otherwise be associated with execution of one or more stored procedures, applications, processes, and/or methods (e.g., the methods 900, 1000, and 1100 in this disclosure, and/or one or more portions and/or combinations thereof) as described in this disclosure.

According to some embodiments, a bingo player may, for example, connect to the bingo broadcaster cluster 118 via a desktop client device to acquire bingo game data and play a bingo game. In one or more embodiments, the bingo broadcaster cluster 118 sends information, such as number calls (e.g., determined by and received from a bingo game server) and/or winner information, to the bingo game player in a manner that provides for an enjoyable game play experience.

In some embodiments, the bingo broadcaster cluster 118 may also provide game data to users of mobile devices (e.g., mobile device client 140). In one embodiment, a bingo broadcaster may communicate game data to the mobile device client 140 by forwarding the game data first to a bingo listener 120, such as a Java™-based messaging component, which then forwards the information to a message broker 122 (e.g., an ActiveMQ™ channel) and then to a bingo connection proxy cluster 124 in communication with a client mobile device 140.

The bingo game server cluster 106 may also, in accordance with some embodiments, manage requests to purchase bingo game tickets and award prizes to bingo game winners. A bingo controller cluster 102 according to some embodiments of the present invention may be specially programmed to communicate with the bingo game server cluster 106 to provide scheduling information to create and schedule bingo games, providing information such as the start and end times for multiple games, in succession, simultaneously, or both. For example, the bingo controller cluster 102 may communicate with the database 104 to read stored schedules for games. The bingo controller cluster 102 may, in some embodiments, create new bingo games based on a stored schedule for a predetermined time period (e.g., a 24-hour time frame). According to one embodiment, once new bingo games are created, the bingo game server cluster 106 may then be informed (e.g., by a bingo controller) as to what games are available, and can sell these bingo games at appropriate times (e.g., in accordance with a schedule), as indicated by the bingo controller cluster 102.

In one or more embodiments of the present invention, a bingo game may provide a bonus game at the end of bingo play. The bonus game may not be considered part of the initial bingo game, so in some embodiments, a scheduler server cluster 114 may be used by the bingo game system 100 to set a schedule, or otherwise alter the existing bingo game schedules, to allow time for bonus game play. This schedule server cluster 114 may, in some embodiments, communicate with the bingo game server cluster 106. In one or more embodiments, information from the schedule server cluster 114 may be cached in the high-volume data management cache 112.

Accordingly, Applicants have provided for specialized bingo game servers, controllers, and systems providing for advantages of scalability and accommodating communication with a variety of types of client devices, and, in accordance with some embodiments, further configured to provide for the specialized functions of one or more types of bingo games.

According to some embodiments, a bingo game server may comprise a computing device for facilitating play of a bingo game (e.g., by receiving an input from a player, determining an outcome for a bingo game, causing an outcome of a bingo game to be displayed on a player device, facilitating a wager and/or a provision of a payout for a bingo game). For example, the bingo game server may comprise a server computer operated by a bingo game provider or another entity (e.g., a social network website). In some embodiments, the game server may determine an outcome for a first aspect and/or second aspect of a bingo game by requesting and receiving such an outcome from another remote server operable to provide such outcomes. In some embodiments, the bingo game server may further be operable to facilitate a bingo game program for a bingo game (e.g., a wagering game). In accordance with some embodiments, in addition to administering or facilitating play of a bingo game, a bingo game server may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, a bingo game server may comprise two or more server computers operated by the same entity (e.g., one server being primarily for storing states of games in progress and another server being primarily for storing mechanisms for determining outcomes of games, such as a random number generator).

In accordance with some embodiments, a player's device 130 and/or device 140 may be used to play a wagering or non-wagering bingo game over a network and to output information relating to the game to the player participating in the game (e.g., outcomes for a round of a bingo game, special numbers for a player, qualifying for a level upgrade in the game, balance of credits available for play of the game, etc.). Any and all information relevant to any of the aforementioned functions may be stored locally on one or more of a player's devices and/or may be accessed using one or more of the player's devices (in one embodiments such information being stored on, or provided via, the bingo game server). In another embodiment, a player's device may store some or all of the program instructions for providing one or more of the functions described with respect to bingo game server (e.g., in a downloadable software application). In some embodiments, the bingo game server may be operable to authorize the one or more of the player's devices to access such information and/or program instructions remotely via a network and/or download from the bingo game server (e.g., directly or via an intermediary server such as a game webserver) some or all of the program code for executing one or more of the various functions described in this disclosure. In other embodiments, outcome and result determinations may be carried out by a bingo game server (or another server with which the bingo game server communicates) and a player's devices may be terminals for displaying to an associated player such outcomes and results and other graphics and data related to a bingo game.

Figure 2:
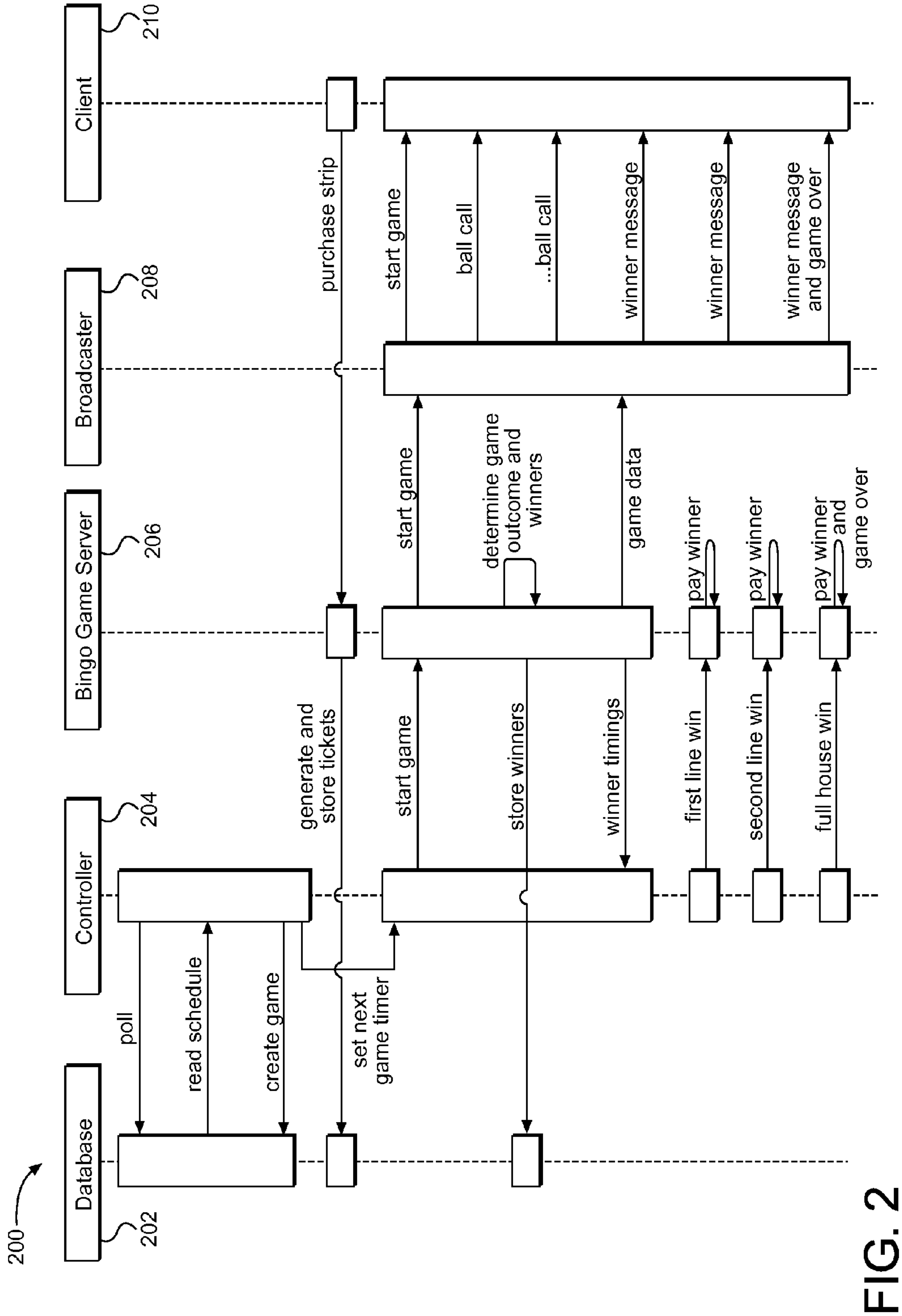
FIG. 2 is a block diagram of a bingo system according to one or more embodiments.

Referring now to FIG. 2, a block diagram of a bingo game system 200 according to some embodiments is shown. The bingo game system 200, in accordance with some embodiments of the present invention, may comprise a database 202, a controller 204, a bingo game server 206, a broadcaster 208, and a client 210. As depicted in FIG. 2, a client device 210 of a player may initiate (e.g., via a gaming website) a purchase of a strip of one or more bingo game tickets from a bingo game server 206. The bingo game server 206 may then generate and store tickets for the player on a database 202.

In some embodiments, as depicted in bingo game system 200, the database 202 may be in communication with a controller 204. The controller 204 may, for example, poll the database 202 for a gaming schedule stored in the database, and read a schedule provided by the controller 204. Based on this information, the controller 204 may then create a game which may, in turn, be stored by the database 202.

In one or more embodiments, a player's gaming experience may or may not be affected by game data which may include, for example, the player's game play history (e.g., stored in the database 202). For example, the database 202 may store information concerning game winners, and may send this information to the bingo game server 206, which may then use this data to affect the game in one or more ways described in this specification. The bingo game server 206, in some examples, may send game data to the broadcaster 208 to control what is broadcast to the client device 210 (e.g., based on how the bingo game server 206 may have altered the game). In some embodiments, the bingo game server 206 affects both game data and winner timings based on data stored in the database 202.

In one or more embodiments, once a game is created, the controller 204 may set a timer to determine when the next game should begin. Once the game is scheduled to begin, the controller 204 may, in some examples, communicate with the bingo game server 206 to begin game play. The bingo game server 206 then preferably communicates with the broadcaster 208 to begin game play. The broadcaster 208, in turn, broadcasts the started game to the client 210. Once game play is initiated, the broadcaster 208 may communicate with the client device 210 directly. According to some embodiments, the client device 210 may comprise, without limitation, a player's tablet computer, desktop computer, or mobile device. As depicted with respect to functions of the bingo game system 200, the broadcaster 208 may, for example, communicate a plurality of ball calls in real time, present winner messages if applicable, and provide "game over" signals. In one or more embodiments, the game outcome and winners may be determined by the bingo game server 206. In some embodiments, for example, the controller 204 may alert the bingo game server 206 as to the end of game play (e.g., upon the completion of the first line, second line, and full house winners), and the bingo game server 206 facilitates payment of the winners (e.g., by initiating the transfer of winnings to a player accounts).

Figure 3:
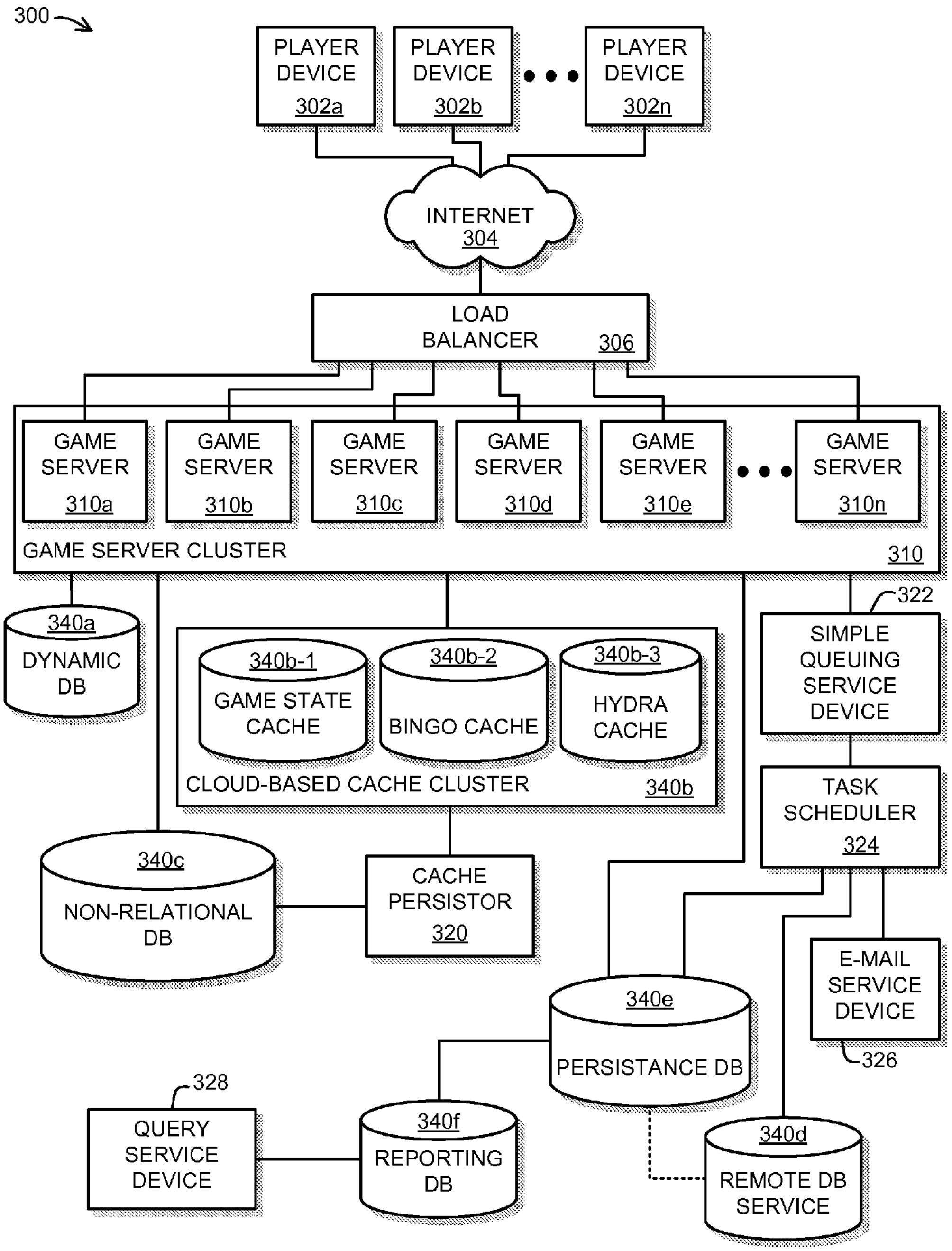
FIG. 3 is a block diagram of a system according to one or more embodiments.

Referring now to FIG. 3, a block diagram of a system 300 according to some embodiments is shown. In some embodiments, the system 300 may comprise a gaming platform such as a platform via which social, multiplayer, and/or online games may be played (e.g., one or more bingo games as described in this disclosure). In some embodiments, the system 300 may comprise a plurality of player devices 302*a-n*, the Internet 304, a load balancer 306, and/or a game server cluster 310. The game server cluster 310 may, in some embodiments, comprise a plurality of game servers 310*a-n*. In some embodiments, the system 300 may comprise a cache persistor 320, a Simple Queuing Service (SQS) device 322, a task scheduler 324, an e-mail service device 326, and/or a query service device 328. As depicted in FIG. 3, any or all of the various components 302*a-n*, 304, 306, 310*a-n*, 320, 322, 324, 326, 328 may be in communication with and/or coupled to one or more databases 340*a-f*. The system 300 may comprise, for example, a dynamic database (DB) 340*a*, a cloud-based cache cluster 340*b* (e.g., comprising a game state cache 340*b*-1, a bingo cache 340*b*-2, and/or a "hydra" cache 340*b*-3), a non-relational DB 340*c*, a remote DB service 340*d*, a persistence DB 340*e*, and/or a reporting DB 340*f*.

According to some embodiments, any or all of the components 302*a-n*, 304, 306, 310*a-n*, 320, 322, 324, 326, 328, 340*a-f* of the system 300 may be similar in configuration and/or functionality to any similarly named and/or numbered components described in this disclosure. Fewer or more components 302*a-n*, 304, 306, 310*a-n*, 320, 322, 324, 326, 328, 340*a-f* (and/or portions thereof) and/or various configurations of the components 302*a-n*, 304, 306, 310*a-n*, 320, 322, 324, 326, 328, 340*a-f* may be included in the system 300 without deviating from the scope of embodiments described in this disclosure. While multiple instances of some components 302*a-n*, 310*a-n*, 340*a-f* are depicted and while single instances of other components 304, 306, 320, 322, 324, 326, 328 are depicted, for example, any component 302*a-n*, 304, 306, 310*a-n*, 320, 322, 324, 326, 328, 340*a-f* depicted in the system 300 may comprise a single device, a combination of devices and/or components 302*a-n*, 304, 306, 310*a-n*, 320, 322, 324, 326, 328, 340*a-f*, and/or a plurality of devices, as is or becomes desirable and/or practicable. Similarly, in some embodiments, one or more of the various components 302*a-n*, 304, 306, 310*a-n*, 320, 322, 324, 326, 328, 340*a-f* may not be needed and/or desired in the system 300.

According to some embodiments, the player devices 302*a-n* may be utilized to access (e.g., via the Internet 304 and/or one or more other networks not explicitly shown) content provided by the game server cluster 310. The game server cluster 310 may, for example, provide, manage, host, and/or conduct various online and/or otherwise electronic games such as online bingo, slot-style games, poker, and/or other games of chance, skill, and/or combinations thereof. In some embodiments, the various game servers 310*a-n* (virtual and/or physical) of the game server cluster 310 may be configured to provide, manage, host, and/or conduct individual instances and/or sessions of available game types. A first game server 310*a*, for example, may host a first particular session of an online bingo game (or tournament), a second game server 310*c* may host a second particular session of an online bingo game (or tournament), a third game server 310*c* may facilitate an online poker tournament (e.g., and a corresponding plurality of game sessions that comprise the tournament), and/or a fourth game server 310*d* may provide an online slots game (e.g., by hosting one or more slot game sessions).

In some embodiments, the player devices 302*a-n* may comprise various components (hardware, firmware, and/or software; not explicitly shown) that facilitate game play and/or interaction with the game server cluster 310. The player device 302*a-n* may, for example, comprise a gaming client such as a software application programmed in Adobe® Flash® and/or HTML5 that is configured to send requests to, and receive responses from, one or more of the game servers 310*a-n* of the game server cluster 310. In some embodiments, such an application operating on and/or via the player devices 302*a-n* may be configured in model-view-controller (MVC) architecture with a communication manager layer responsible for managing the requests to/responses from the game server cluster 310. In some embodiments, one or more of the game servers 310*a-n* may also or alternatively be configured in a MVC architecture with a communication manager and/or communications management layer (not explicitly shown in FIG. 3). In some embodiments, communications between the player devices 302*a-n* and the game server cluster 310 may be conducted in accordance with the hypertext transfer protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 302*a-n* and the game server cluster 310 may be managed and/or facilitated by the load balancer 306. The load balancer 306 may, for example, route communications from player devices 302*a-n* to one or more of the specific game servers 310*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 306 may comprise one or more devices and/or services provided by a third-party (not separately shown in FIG. 3). The load balancer 306 may, for example, comprise an elastic load balancer (ELB) service provided by Amazon® Web Services, LLC of Seattle, Wash. According to some embodiments, such as in the case that the load balancer 306 comprises the ELB or a similar service, the load balancer 306 may manage, set, determine, define, and/or otherwise influence the number of game servers 310*a-n* within the game server cluster 310. In the case that traffic and/or requests from the player devices 302*a-n* only require the first and second game servers 310*a-b*, for example, all other game servers 310*c-n* may be taken off-line, may not be initiated and/or called, and/or may otherwise not be required and/or utilized in the system 300. As demand increases (and/or if performance, security, and/or other issues cause one or more of the first and second game servers 310*a-b* to experience detrimental issues), the load balancer 306 may call and/or bring online one or more of the other game servers 310*c-n* depicted in FIG. 3. In the case that each game server 310*a-n* comprises an instance of a resizable compute capacity service, such as the Amazon Elastic Compute Cloud™ (Amazon EC2™) web service provided by Amazon Web Services, Inc., the load balancer 306 may add or remove instances as is or becomes practicable and/or desirable.

In some embodiments, the load balancer 306 and/or the Internet 304 may comprise one or more proxy servers and/or devices (not shown in FIG. 3) via which communications between the player devices 302*a-n* and the game server cluster 310 are conducted and/or routed. Such proxy servers and/or devices may comprise one or more regional game hosting centers, for example, which may be geographically dispersed and addressable by player devices 302*a-n* in a given geographic proximity. In some embodiments, the proxy servers and/or devices may be located in one or more geographic areas and/or jurisdictions while the game server cluster 310 (and/or certain game servers 310*a-n* and/or groups of game servers 310*a-n* thereof) is located in a separate and/or remote geographic area and/or jurisdiction.

According to some embodiments, for specific game types such as bingo, the game server cluster 310 may provide game results (such as a full set of drawn bingo numbers and/or bonus metrics) to a controller device (not separately shown in FIG. 3) that times the release of game result information to the player devices 302*a-n* such as by utilizing a broadcaster device (also not separately shown in FIG. 3) that transmits the time-released game results to the player devices 302*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 310 (and/or one or more of the game servers 310*a-n* thereof) may be in communication with the dynamic DB 340*a*. According to some embodiments, the dynamic DB 340*a* may comprise a dynamically-scalable database service such as the DynamoDB™ service provided by Amazon Web Services, Inc. The dynamic DB 340*a* may, for example, store information specific to one or more certain game types (e.g., bingo games) provided by the game server cluster 310 such as to allow, permit, and/or facilitate reporting and/or analysis of such information.

According to some embodiments, the game server cluster 310 (and/or one or more of the game servers 310*a-n* thereof) may be in communication with the cloud-based cache cluster 340*b*. Game state information from the game server cluster 310 may be stored in the game state cache 340*b*-1; bingo state data (e.g., the current state of spaces (marked or unmarked) of a player's bingo card, history of called balls, information about ball call order, etc.) may be stored in the bingo cache 340*b*-2; and/or other game and/or player information (e.g., progressive data, referral data, player rankings, audit data) may be stored in the hydra cache 340*b*-3. In some embodiments, the cache persistor 320 may move and/or copy data stored in the cloud-based cache cluster 340*b* to the non-relational DB 340*c*. The non-relational DB 340*c* may, for example, comprise a SimpleDB™ service provided by Amazon Web Services, Inc. According to some embodiments, the game server cluster 310 may generally access the cloud-based cache cluster 340*b* as-needed to store and/or retrieve game-related information. The data stored in the cloud-based cache cluster 340*b* may generally comprise a subset of the newest or freshest data, while the cache persistor 320 may archive and/or store or move such data to the non-relational DB 340*c* as it ages and/or becomes less relevant (e.g., once a player logs-off, once a game session and/or tournament ends). The game server cluster 310 may, in accordance with some embodiments, have access to the non-relational DB 340*c* as-needed and/or desired. The game servers 310*a-n* may, for example, be initialized with data from the non-relational DB 340*c* and/or may store and/or retrieve low frequency and/or low priority data via the non-relational DB 340*c*.

In some embodiments, the SQS device 322 may queue and/or otherwise manage requests, messages, events, and/or other tasks or calls to and/or from the server cluster 310. The SQS device 322 may, for example, prioritize and/or route requests between the game server cluster 310 and the task scheduler 324. In some embodiments, the SQS device 322 may provide mini-game and/or tournament information to the server cluster 310. According to some embodiments, the task scheduler 324 may initiate communications with the SQS device 322, the e-mail service provider 326 (e.g., providing e-mail lists), the remote DB service 340*d* (e.g., providing inserts and/or updates), and/or the persistence DB 340*e* (e.g., providing and/or updating game, player, and/or other reporting data), e.g., in accordance with one or more schedules.

According to some embodiments, the persistence DB 340*e* may comprise a data store of live environment game and/or player data. The game server cluster 310 and/or the task scheduler 324 or SQS device 322 may, for example, store game and/or player data to the persistence DB 340*e* and/or may pull and/or retrieve data from the persistence DB 340*e*, as-needed and/or desired. The server cluster 310 may, according to some embodiments, provide and/or retrieve spin and/or other game event info and/or configuration information via the persistence DB 340*e*.

In some embodiments, the reporting DB 340*f* may be created and/or populated based on the persistence DB 340*e*. On a scheduled and/or other basis, for example, a data transformation and/or mapping program may be utilized to pull data from the live environment (e.g., the persistence DB 340*e*) into the reporting DB 340*f*. The query service 328 may then be utilized, for example, to query the reporting DB 340*f*, without taxing the live environment and/or production system directly accessible by the game server cluster 310.

According to some embodiments, any or all of the player devices 302*a-n* in conjunction with one or more of the game servers 310*a-n* and/or the databases 340*a-f* (e.g., via the network 304) may conduct (in whole or in part), facilitate, and/or otherwise be associated with execution of one or more stored procedures, applications, processes, and/or methods (e.g., the methods 900, 1000, and 1100 in this disclosure, and/or one or more portions and/or combinations thereof) as described in this disclosure.

Figure 4:
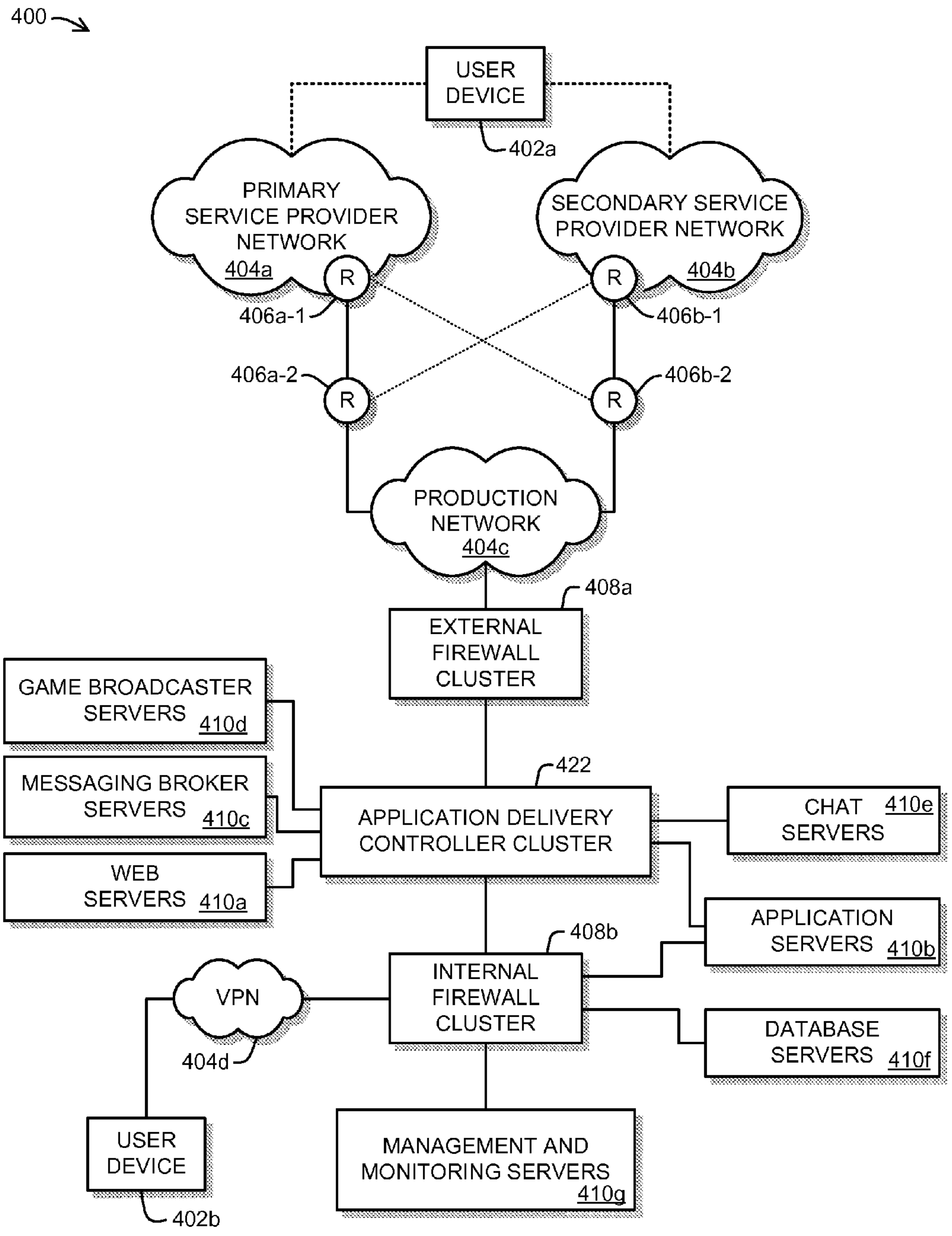
FIG. 4 is a block diagram of a system according to one or more embodiments.

Turning now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more bingo games as described in this disclosure). In some embodiments, the system 400 may comprise a plurality of user devices 402*a-b*, a plurality of networks 404*a-b* (e.g., a primary service provider network 404*a*, a secondary service provider network 404*b*, a production network 404*c*, and/or a VPN 404*d*), a plurality of routers 406*a-b*, a plurality of firewall devices 408*a-b*, a plurality of game servers 410*a-g* (e.g., web servers 410*a*, application servers 410*b*, messaging broker servers 410*c*, game broadcaster servers 410*d*, chat servers 410*e*, database servers 410*f*, and/or management and monitoring servers 410*g*), and/or an application delivery controller cluster 422.

According to some embodiments, any or all of the components 402*a-b*, 404*a-b*, 406*a-b*, 408*a-b*, 410*a-g*, 422 of the system 400 may be similar in configuration and/or functionality to any similarly named and/or numbered components described in this disclosure. Fewer or more components 402*a-b*, 404*a-b*, 406*a-b*, 408*a-b*, 410*a-g*, 422 (and/or portions thereof) and/or various configurations of the components 402*a-b*, 404*a-b*, 406*a-b*, 408*a-b*, 410*a-g*, 422 may be included in the system 400 without deviating from the scope of embodiments described in this disclosure. While multiple instances of some components 402*a-b*, 404*a-b*, 406*a-b*, 408*a-b*, 410*a-g* are depicted and while single instances of other components 422 are depicted, for example, any component 402*a-b*, 404*a-b*, 406*a-b*, 408*a-b*, 410*a-g*, 422 depicted in the system 400 may comprise a single device, a combination of devices and/or components 402*a-b*, 404*a-b*, 406*a-b*, 408*a-b*, 410*a-g*, 422, and/or a plurality of devices, as is or becomes desirable and/or practicable. Similarly, in some embodiments, one or more of the various components 402*a-b*, 404*a-b*, 406*a-b*, 408*a-b*, 410*a-g*, 422 may not be needed and/or desired in the system 400.

In some embodiments, a first user device 402*a* may comprise an electronic device owned and/or operated by a player of an online game (not explicitly shown) and/or by an entity that otherwise accesses online game content and/or services externally (e.g., requiring external login and/or access credentials and/or procedures). The first user device 402*a* may, for example, be utilized to access content provided by and/or via the application delivery controller cluster 422. In some embodiments, the first user device 402*a* may interface with and/or connect to the production network 404*c* via the primary service provider network 404*a* and/or the secondary service provider network 404*b*. The primary service provider network 404*a* and the secondary service provider network 404*b* may, for example, load balance and/or provide redundant coverage for outage recovery by utilization of a first primary service provider network router 406*a*-1, a second primary service provider network router 406*a*-2, a first secondary service provider network router 406*b*-1, and/or a second secondary service provider network router 406*b*-2.

According to some embodiments, the application delivery controller cluster 422 may be insulated and/or protected from the production network 404*c* by an external firewall cluster 408*a*. The first user device 402*a* may, for example, be required to provide credentials to and/or otherwise access the application delivery controller cluster 422 via the external firewall cluster 408*a*.

In some embodiments, the application delivery controller cluster 422 may receive via and/or from the external firewall cluster 408*a* and/or the production network 404*c*, one or more requests, calls, transmissions, and/or commands from the first user device 402*a*. The first user device 402*a* may, for example, submit a call for an online gaming interface to the application delivery controller cluster 422. In some embodiments, the application delivery controller cluster 422 may comprise one or more hardware, software, and/or firmware devices and/or modules configured (e.g., specially-programmed) to route events and/or responses between the first user device 402*a* and one or more of the servers 410*a-g*. In the case that the first user device 402*a* is utilized to access an online gaming interface for example, one or more of the web servers 410*a* (e.g., that may provide graphical and/or rendering elements for an interface and/or other web services) and/or the application servers 410*b* (e.g., that may provide rule and/or logic-based programming routines, elements, and/or functions—e.g., game play engines) may be called and/or managed by the application delivery controller cluster 422.

In some embodiments, the messaging broker servers 410*c* may receive and/or retrieve messages from the first user device 402*a* (and/or from one or more of the other servers 410*a-b*, 410*d-g*) and perform one or more inter-application processes in relation thereto. The messaging broker servers 410*c* may, for example, route, transform, consolidate, aggregate, store, augment, and/or otherwise process one or more requests in connection with provision of online gaming services to the first user device 402*a* (e.g., facilitating a decoupling of services provided by various applications on and/or from the various servers 410*a-b*, 410*d-g*). According to some embodiments, the game broadcaster servers 410*d* may provide scheduled releases of information descriptive of an online game. The game broadcaster servers 410*d* may, for example, provide a broadcast feed of bingo numbers, slot and/or other random (and/or pseudo-random) number results that may be accessed by (and/or transmitted to) the first user device 402*a* (e.g., in connection with the play of an online bingo, slots, and/or other game for which broadcast information may be utilized). In some embodiments, the chat servers 410*e* may provide, manage, and/or facilitate communications between the first user device 402*a* (and/or first user thereof) and one or more other player/user devices (such as a second user device 402*b* and/or other player/user devices not shown in FIG. 4).

According to some embodiments, the second user device 402*b* may generally comprise an electronic device owned and/or operated by a user (not shown) closely affiliated with an entity that operates the system 400 (such entity also not shown). An employee (e.g., programmer and/or Customer Service Representative (CSR)), contractor, and/or other agent of an online gaming company may, for example, utilize the second user device 402*b* to interface with the privately-accessible VPN 404*d*. The VPN 404*d* may, for example, provide direct access to the application servers 410*b*, the database servers 410*f*, the management and monitoring servers 410*g*, and/or the application delivery controller cluster 422. In some embodiments (as depicted in FIG. 4), such access may be gated through and/or insulated or protected by an internal firewall cluster 408*b*. The second user device 402*b* may, for example, be required to provide credentials to and/or otherwise access the application delivery controller cluster 422 and/or servers 410*a-g* via the internal firewall cluster 408*b*.

In some embodiments, the database servers 410*f* may provide access to one or more databases and/or data stores (e.g., not shown in FIG. 4; for data storage and/or retrieval). In some embodiments, the management and monitoring servers 410*g* may provide services such as monitoring, reporting, troubleshooting, analysis, configuring, etc. to the second user device 402*b*. The second user device 402*b* may, for example, access the management and monitoring servers 410*g* and/or the database servers 410*f* to run reports descriptive of online gaming operations, game play, and/or game referral setup, management, and/or analysis. According to some embodiments, either or both of the user devices 402*a-b* in conjunction with one or more of the servers 410*a-g* and/or the application delivery controller cluster 422 may conduct (in whole or in part), facilitate, and/or otherwise be associated with execution of one or more stored procedures, applications, processes, and/or methods (e.g., the methods 900, 1000, and 1100 in this disclosure, and/or one or more portions and/or combinations thereof).

Utilization of the term "server" with respect to the servers 410*a-g* of the system 400 of FIG. 4 is meant solely to ease description of the configuration and/or functionality of the servers 410*a-g*. The term "server" is not intended to be limiting with respect to any particular hardware, software, firmware, and/or quantities thereof utilized to implement any or all of the servers 410*a-g* of the system 400. Similarly, while multiple types and/or instances of the servers 410*a-g* are depicted in FIG. 4, any or all of the servers 410*a-g* may be implemented in, on, and/or by one or multiple computer server and/or other electronic devices.

Figure 5:
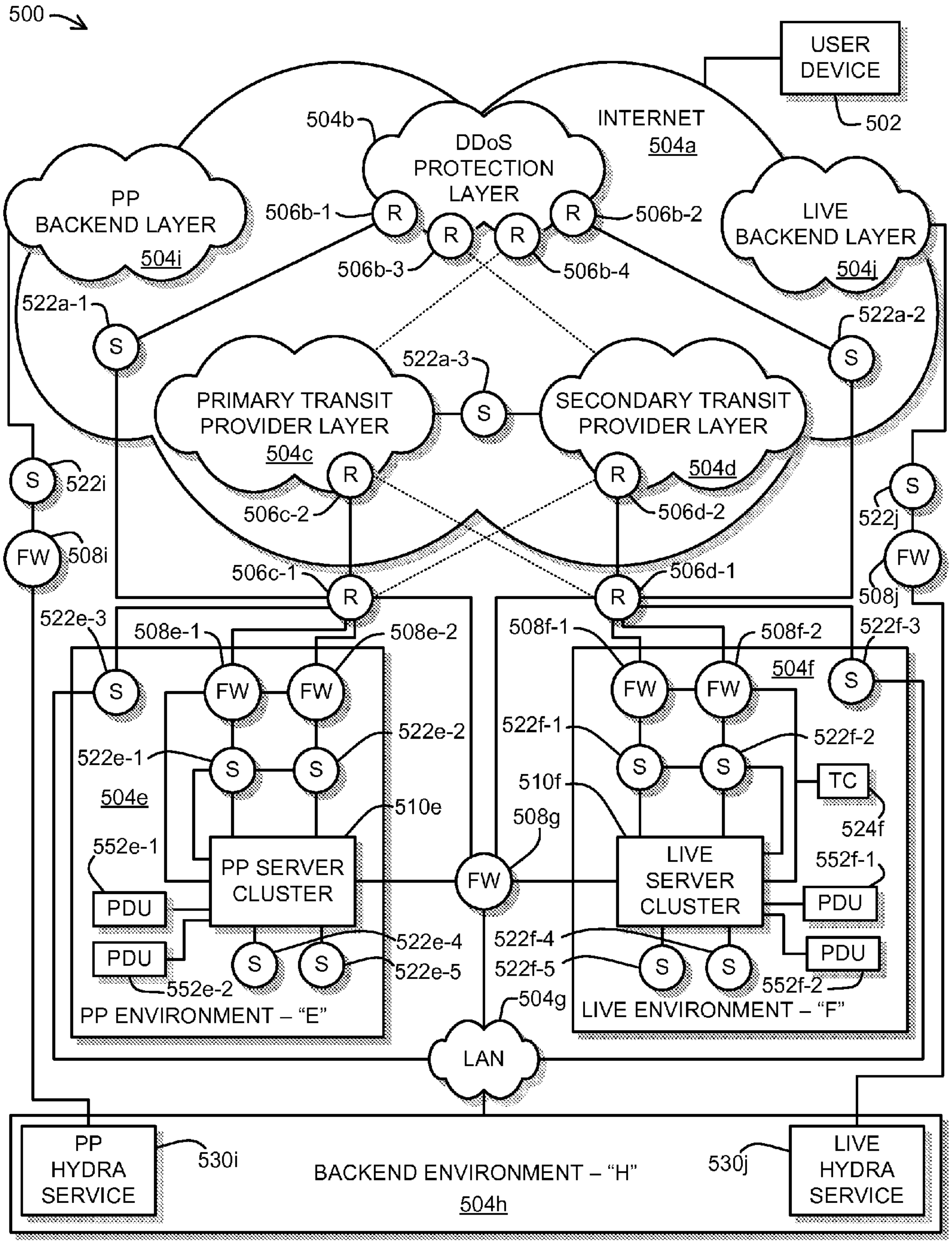
FIG. 5 is a block diagram of a system according to one or more embodiments.

Referring now to FIG. 5, a block diagram of a system 500 according to some embodiments is shown. In some embodiments, the system 500 may comprise and/or define a "front-end" architecture of a gaming platform such as a platform via which social, multiplayer, and/or online games may be played (e.g., one or more bingo games as described in this disclosure). The system 500 may be similar in configuration and/or functionality, for example, to the system 400 of FIG. 4 and/or one or more portions thereof. In some embodiments, the system 500 may comprise a user device 502, a plurality of networks (and/or environments and/or layers) 504*a-j* (e.g., the Internet 504*a*, a distributed denial-of-service (DDoS) protection layer 504*b*, a primary transit provider layer 504*c*, a secondary transit provider layer 504*d*, a pre-production (PP) environment 504*e*, a live environment 504*f*, a LAN 504*g*, a backend environment 504*h*, a PP backend layer 504*i*, and/or a live backend layer 504*j*), a plurality of routers 506*b-d*, a plurality of firewall devices 508*e-g* and 508*i-j*, a plurality of servers 510*e-f* (e.g., a PP server cluster 510*e* and/or a live server cluster 510*f*), a plurality of switching devices 522*a*, 522*e-f*, 522*i-j*, a terminal concentrator (TC) 524*f*, a plurality of "hydra" services 530*i-j* (e.g., a PP hydra service 530*i* and/or a live hydra service 530*j*), and/or a plurality of power distribution unit (PDU) devices 552*e-f*.

According to some embodiments, any or all of the components 502, 504*a-j*, 506*b-d*, 508*e-g*, 508*i-j*, 510*e-f*, 522*a*, 522*e-f*, 522*i-j*, 524*f*, 530*i-j*, 552*e-f* of the system 500 may be similar in configuration and/or functionality to any similarly named and/or numbered components described in this disclosure. Fewer or more components 502, 504*a-j*, 506*b-d*, 508*e-g*, 508*i-j*, 510*e-f*, 522*a*, 522*e-f*, 522*i-j*, 524*f*, 530*i-j*, 552*e-f* (and/or portions thereof) and/or various configurations of the components 502, 504*a-j*, 506*b-d*, 508*e-g*, 508*i-j*, 510*e-f*, 522*a*, 522*e-f*, 522*i-j*, 524*f*, 530*i-j*, 552*e-f* may be included in the system 500 without deviating from the scope of embodiments described in this disclosure. While multiple instances of some components 504*a-j*, 506*b-d*, 508*e-g*, 508*i-j*, 510*e-f*, 522*a*, 522*e-f*, 522*i-j*, 530*i-j*, 552*e-f* are depicted and while single instances of other components 502, 524*f* are depicted, for example, any component 502, 504*a-j*, 506*b-d*, 508*e-g*, 508*i-j*, 510*e-f*, 522*a*, 522*e-f*, 522*i-j*, 524*f*, 530*i-j*, 552*e-f* depicted in the system 500 may comprise a single device, a combination of devices and/or components 502, 504*a-j*, 506*b-d*, 508*e-g*, 508*i-j*, 510*e-f*, 522*a*, 522*e-f*, 522*i-j*, 524*f*, 530*i-j*, 552*e-f*, and/or a plurality of devices, as is or becomes desirable and/or practicable. Similarly, in some embodiments, one or more of the various components 502, 504*a-j*, 506*b-d*, 508*e-g*, 508*i-j*, 510*e-f*, 522*a*, 522*e-f*, 522*i-j*, 524*f*, 530*i-j*, and 552*e-f* may not be needed and/or desired in the system 500.

In some embodiments, the user device 502 may be utilized to access one or more of the PP environment 504*e*, the live environment 504*f*, and/or the backend environment 504*h* via the Internet 504*a*. In some embodiments, the user device 502 may be utilized to access the backend environment 504*h* and/or the PP hydra service 530*i* via the PP backend layer 504*i*. A PP backend switch device 522*i* and/or a PP backend firewall device 508*i* may, for example, gate and/or control access to the backend environment 504*h* and/or the PP hydra service 530*i*, via the PP backend layer 504*i*. In some embodiments, the user device 502 may be utilized to access the backend environment 504*h* and/or the live hydra service 530*j* via the live backend layer 504*j*. A live backend switch device 522*j* and/or a live backend firewall device 508*j* may, for example, gate and/or control access to the backend environment 504*h* and/or the live hydra service 530*j*, via the live backend layer 504*j*.

According to some embodiments, any communications (e.g., requests, calls, and/or messages) from the user device 502 may be passed through the DDoS protection layer 504*b*. The DDoS protection layer 504*b* may, for example, monitor and/or facilitate protection against various forms of cyber attacks including, but not limited to, DDoS attacks. In some embodiments, the DDoS protection layer 504*b* may comprise and/or be in communication with a plurality of DDoS router devices 506*b*-1, 506*b*-2, 506*b*-3, 506*b*-4 that may be utilized to route and/or direct incoming communications (e.g., from the user device 502) to appropriate portions of the system 500.

In some embodiments, the DDoS protection layer 504*b* and/or a first DDoS router device 506*b*-1 may route communications from the user device 502 through and/or via a first switch device 522*a*-1 and/or to, through, and/or via a first primary transit provider router device 506*c*-1. In some embodiments, the first switch device 522*a*-1 may comprise a device utilized for security switching such as may implement communications in accordance with the generic routing encapsulation (GRE) communications tunneling protocol described in RFC 2784 "Generic Routing Encapsulation (GRE)" published by the Network Working Group (NWG) in March, 2000. The first primary transit provider router device 506*c*-1 may, for example, provide access to the PP environment 504*e* and/or the PP server cluster 510*e* thereof, such as via one or more PP firewall devices 508*e*-1, 508*e*-2 and/or one or more PP switch devices 522*e*-1, 522*e*-2. According to some embodiments, the PP switch devices 522*e*-1, 522*e*-2 may comprise content switching devices that process and route data (e.g., in the data link layer) based on data content. In some embodiments, the first primary transit provider router device 506*c*-1 may direct communications to, through, and/or via a PP LAN switch device 522*e*-3 that provides and/or facilitates access to the LAN 504*g*. The LAN 504*g* may, for example, provide private access to and/or between the PP environment 504*e*, the live environment 504*f*, and/or the backend environment 504*h*. In some embodiments, the first primary transit provider router device 506*c*-1 and/or the PP LAN switch device 522*e*-3 may direct communications to, through, and/or via a LAN firewall device 508*g* that provides direct access to either or both of the PP server cluster 510*e* and the live server cluster 510*f*.

According to some embodiments, the DDoS protection layer 504*b* and/or a second DDoS router device 506*b*-2 may route communications from the user device 502 through and/or via a second switch device 522*a*-2 and/or to, through, and/or via a first secondary transit provider router device 506*d*-1. In some embodiments, the second switch device 522*a*-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 506*d*-1 may, for example, provide access to the live environment 504*f* and/or the live server cluster 510*f* thereof, such as via one or more live firewall devices 508*f*-1, 508*f*-2 and/or one or more live switch devices 522*f*-1, 522*f*-2. According to some embodiments, the live switch devices 522*f*-1, 522*f*-2 may comprise content switching devices that process and route data (e.g., in the data link layer) based on data content. In some embodiments, the first secondary transit provider router device 506*d*-1 may direct communications to, through, and/or via a live LAN switch device 522*f*-3 that provides and/or facilitates access to the LAN 504*g*. In some embodiments, the first secondary transit provider router device 506*d*-1 and/or the live LAN switch device 522*f*-3 may direct communications to, through, and/or via the LAN firewall device 508*g* that provides direct access to either or both of the PP server cluster 510*e* and the live server cluster 510*f*.

In some embodiments, the DDoS protection layer 504*b* and/or one or more of a third DDoS router device 506*b*-3 and/or a fourth DDoS router device 506*b*-4 may route communications from the user device 502 through and/or via one or more of the primary transit provider layer 504*c* and/or the secondary transit provider layer 504*d*. In some embodiments, a transit provider switch device 522*a*-3 may direct, swap, route, and/or manage communications between the primary transit provider layer 504*c* and the secondary transit provider layer 504*d*. According to some embodiments, the transit provider switch device 522*a*-3 may comprise a switching device that operates in accordance with an Exterior Border Gateway Protocol (EBGP)—e.g., the transit provider switch device 522*a*-3 may comprise one or more edge or border routers. In some embodiments, the first primary transit provider router device 506*c*-1, the first secondary transit provider router device 506*d*-1, a second primary transit provider router device 506*c*-2, and/or a second secondary transit provider router device 506*d*-2 may be utilized to route and/or direct communications between (i) the primary transit provider layer 504*c* and/or the secondary transit provider layer 504*d* and (ii) the PP environment 504*e* and/or the live environment 504*f*.

According to some embodiments, the PP server cluster 510*e* and/or the PP environment 504*e* may comprise various hardware, software, and/or firmware that permits a user (e.g., of the user device 502) to program, edit, manage, and/or otherwise interface with PP game elements and/or interfaces (e.g., for development and/or testing purposes). In some embodiments, the PDU devices 552*e*-1, 552*e*-2 may generally provide power distribution, supply, management, backup, and/or conditioning services (e.g., to the PP server cluster 510*e*) as is or becomes desired. According to some embodiments, additional switch devices 522*e*-4, 522*e*-5 may be utilized to distribute, balance, manage, and/or control communications to, from, and/or within the PP server cluster 510*e*.

In some embodiments, the live server cluster 510*f* and/or the live environment 504*f* may comprise various hardware, software, and/or firmware that permits a user (e.g., of the user device 502) to program, edit, manage, and/or otherwise interface with live game elements and/or interfaces (e.g., for troubleshooting, corrective, and/or live environment management purposes). In some embodiments, the PDU devices 552*f*-1, 552*f*-2 may generally provide power distribution, supply, management, backup, and/or conditioning services (e.g., to the live server cluster 5100 as is or becomes desired. According to some embodiments, additional switch devices 522*f*-4, 522*f*-5 may be utilized to distribute, balance, manage, and/or control communications to, from, and/or within the live server cluster 510*f*. In some embodiments, the TC device 524*f* may be utilized to manage communications from a variety of data sources such as by providing communication capability between various communications channels (not separately depicted in FIG. 5).

According to some embodiments, the user device 502 in conjunction with the live server cluster 510*f* (e.g., via the Internet 504*a*) may conduct (in whole or in part), facilitate, and/or otherwise be associated with execution of one or more stored procedures, applications, processes, and/or methods (e.g., the methods 900, 1000, and 1100 in this disclosure, and/or one or more portions and/or combinations thereof) as described in this disclosure.

Figure 6:
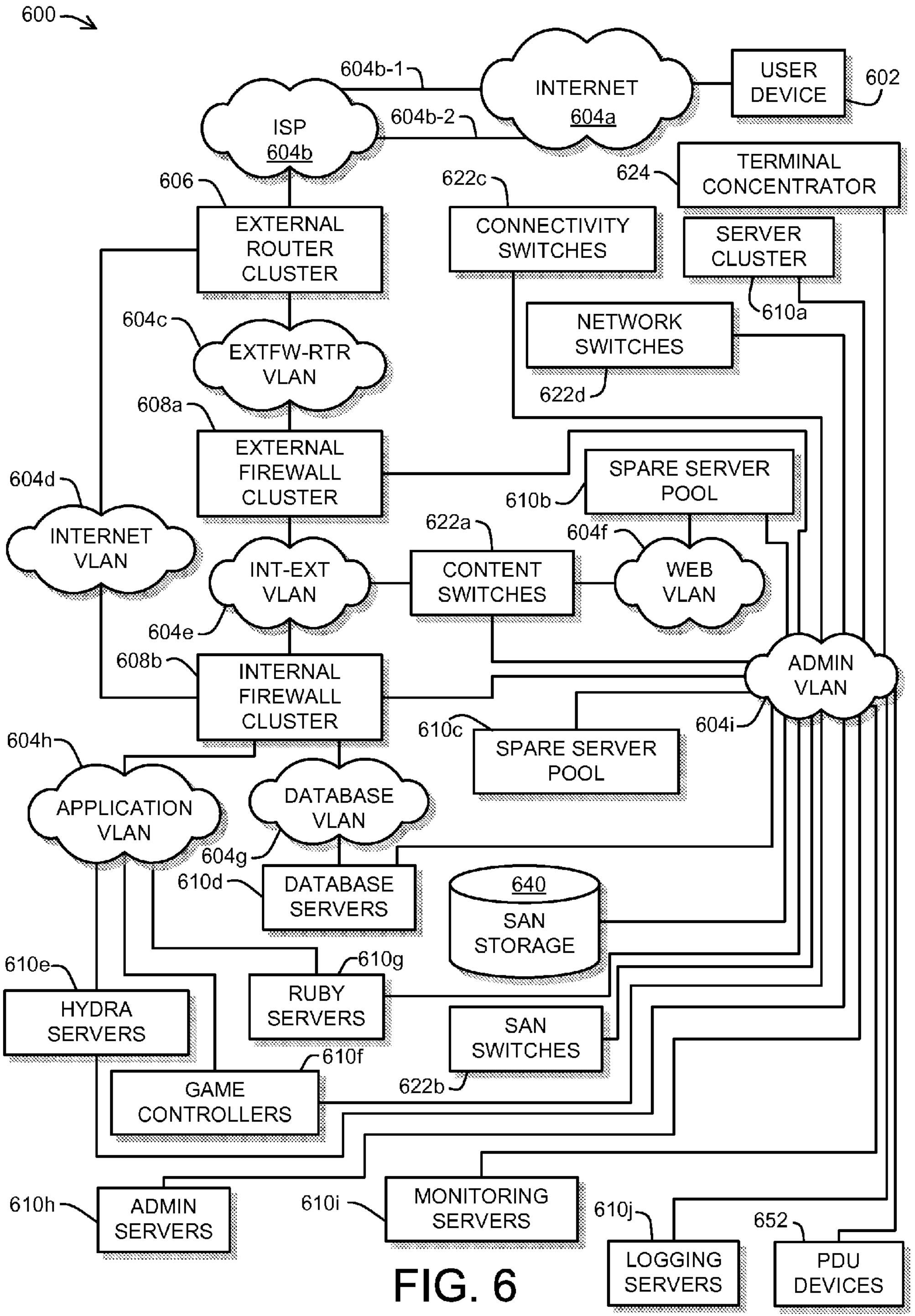
FIG. 6 is a block diagram of a system according to one or more embodiments.

Turning to FIG. 6, a block diagram of a system 600 according to some embodiments is shown. In some embodiments, the system 600 may comprise and/or define a "backend" architecture of a gaming platform such as a platform via which social, multiplayer, and/or online games may be played (e.g., one or more bingo games as described in this disclosure). The system 600 may be utilized in conjunction with the systems 400, 500 of FIG. 4 and/or FIG. 5 in this disclosure, for example, and/or may be similar in configuration and/or functionality to the backend environment 504*h* of the system 500 of FIG. 5. In some embodiments, the system 600 may comprise a user device 602, a plurality of networks (and/or environments and/or layers) 604*a-i* (e.g., the Internet 604*a*, an ISP 604*b*, an External Firewall-Router (EXTFW-RTR) Virtual LAN (VLAN) 604*c*, an Internet VLAN 604*d*, an Internal-External (INT-EXT) VLAN 604*e*, a web VLAN 604*f*, a database VLAN 604*g*, an application VLAN 604*h*, and/or an administrator VLAN 604*i*), an external router cluster 606, a plurality of firewall clusters 608*a-b* (e.g., an external firewall cluster 608*a* and/or an internal firewall cluster 608*b*), a plurality of servers 610*a-j* (e.g., a server cluster 610*a*, a first spare server pool 610*b*, a second spare server pool 610*c*, database servers 610*d*, "hydra" servers 610*e*, game controllers 610*f*, ruby servers 610*g*, admin servers 610*h*, monitoring servers 610*i*, and/or logging servers 610*j*), a plurality of switches 622*a-d* (e.g., content switches 622*a*, Storage Area Network (SAN) switches 622*b*, connectivity switches 622*c*, and/or network switches 622*d*), a TC device 624, a SAN storage device 640, and/or one or more PDU devices 652.

According to some embodiments, any or all of the components 602, 604*a-i*, 606, 608*a-b*, 610*a-j*, 622*a-d*, 624, 640, 652 of the system 600 may be similar in configuration and/or functionality to any similarly named and/or numbered components described in this disclosure. Fewer or more components 602, 604*a-i*, 606, 608*a-b*, 610*a-j*, 622*a-d*, 624, 640, 652 (and/or portions thereof) and/or various configurations of the components 602, 604*a-i*, 606, 608*a-b*, 610*a-j*, 622*a-d*, 624, 640, 652 may be included in the system 600 without deviating from the scope of embodiments described in this disclosure. While multiple instances of some components 604*a-i*, 608*a-b*, 610*a-j*, 622*a-d* are depicted and while single instances of other components 602, 606, 624, 640, 652 are depicted, for example, any component 602, 604*a-i*, 606, 608*a-b*, 610*a-j*, 622*a-d*, 624, 640, 652 depicted in the system 600 may comprise a single device, a combination of devices and/or components 602, 604*a-i*, 606, 608*a-b*, 610*a-j*, 622*a-d*, 624, 640, 652, and/or a plurality of devices, as is or becomes desirable and/or practicable. Similarly, in some embodiments, one or more of the various components 602, 604*a-i*, 606, 608*a-b*, 610*a-j*, 622*a-d*, 624, 640, 652 may not be needed and/or desired in the system 600.

In some embodiments, the user device 602 may be utilized to access and/or interface with one or more of the servers 610*a-j* via the Internet 604*a*. In some embodiments, the Internet 602*a* may be linked to the ISP 604*b* via multiple (e.g., redundant) connectivity paths 604*b*-1, 604*b*-2 (e.g., for load balancing, security, and/or failure recovery). According to some embodiments, the ISP 604*b* may be in communication with (and/or comprise) the external router cluster 606. The external router cluster 606 may route certain requests, calls, and/or transmissions (and/or users—e.g., based on credentials and/or other information) through the EXTFW-RTR VLAN 604*c* and/or through the external firewall cluster 608*a*, for example, and/or may route certain requests, calls, and/or transmissions (and/or users—e.g., based on credentials and/or other information) through the Internet VLAN 604*d* and/or through the internal firewall cluster 608*b*.

In the case that a user (not shown) of the user device 602 comprises an online game player, consumer, and/or other member of the public, for example, the external router cluster 606 may direct communications through the EXTFW-RTR VLAN 604*c* and/or through the external firewall cluster 608*a*. In the case that the user of the user device 602 comprises a programmer, tester, employee, and/or other agent of an entity that operates the system 600, for example, the external router cluster 606 may direct communications through the Internet VLAN 604*d* and/or through the internal firewall cluster 608*b*. In some embodiments, access via either or both of the external firewall cluster 608*a* and/or the internal firewall cluster 608*b* may permit the user device 602 to communicate via the INT-EXT VLAN 604*e*. The INT-EXT VLAN 604*e* may, for example, provide access to the content switches 622*a* which may, in some embodiments, serve content from any or all of the servers 610*a-j* to the user device 602, as is or becomes appropriate or desired. In some embodiments, the content switches 622*a* may communicate with the first spare server pool 610*b* via the web LAN 604*f*.

According to some embodiments, private and/or other specialized access to the system 600 via the internal firewall cluster 608*b* may permit the user device 602 to communicate via one or more of the database VLAN 604*g*, the application VLAN 604*h*, and/or the admin VLAN 604*i*. The database VLAN 604*g* may be utilized, for example, to access and/or communicate with the database servers 610*d*. In some embodiments, the application VLAN 604*h* may be utilized to access and/or communicate with any or all of the hydra servers 610*e*, the game controllers 610*f*, and/or the ruby servers 610*g*.

The admin VLAN 604*i* may allow, promote, conduct, facilitate, and/or manage a wide variety of communications within the system 600. The admin VLAN 604*i* may, for example, communicatively connect and/or couple any or all of the firewalls 608*a-b*, the servers 610*a-j*, the switches 622*a-d*, the TC device 624, the SAN storage 640, and/or the PDU devices 652. The user device 602 may be utilized, in conjunction with the admin servers 610*h* and/or via the admin VLAN 604*i* for example, to define, edit, adjust, manage, and/or otherwise access settings (and/or data) of the firewalls 608*a-b*, any or all of the switches 622*a-d*, the TC device 624, and/or the PDU devices 652. In some embodiments, the user device 602 (and/or the admin servers 610*h*) may be utilized to manage and/or access content, rules, settings, and/or performance characteristics or preferences for any or all of the servers 610*a-j*.

In some embodiments, the server cluster 610*a* may comprise one or more servers and/or other electronic controller devices (e.g., blade servers) configured to provide online gaming data (e.g., interfaces, outcomes, and/or results) to the user device 602. According to some embodiments, the first spare server pool 610*b* and/or the second spare server pool 610*c* may comprise one or more server and/or other electronic controller devices configured to supplement and/or replace the server cluster 610*a* as needed and/or desired (e.g., to manage load and/or error recovery situations). In some embodiments, the database servers 610*c* may provide and/or manage access to stored data such as data stored in and/or by the SAN storage device 640. In some embodiments, the hydra servers 610*e* and/or the game controllers 610*f* may provide online game information such as interfaces, results, graphics, sounds, and/or other media to the user device 602 (e.g., via the application VLAN 604*h*). In some embodiments, the ruby servers 610*g* may comprise one or more processing devices configured to provide access to one or more programming languages (e.g., "Ruby") and/or Application Programming Interface (API) mechanisms via which the servers 610*a-j* and/or other portions of the system 600 may be configured to operate (e.g., in accordance with specially and/or pre-programmed instructions written in the programming language and/or developed by the API provided by the ruby servers 610*g*). According to some embodiments, the admin servers 610*h*, the monitoring servers 610*i*, and/or the logging servers 610*j* may be utilized and/or configured to provide administrative, parameter and/or metric monitoring and/or reporting, and/or data logging and/or audit services, respectively.

According to some embodiments, the user device 602 in conjunction with one or more of the servers 610*a-j* (e.g., via the Internet 604*a*) may conduct (in whole or in part), facilitate, and/or otherwise be associated with execution of one or more stored procedures, applications, processes, and/or methods (e.g., the methods 900, 1000, and 1100 in this disclosure, and/or one or more portions and/or combinations thereof) as described in this disclosure.

Figure 7:
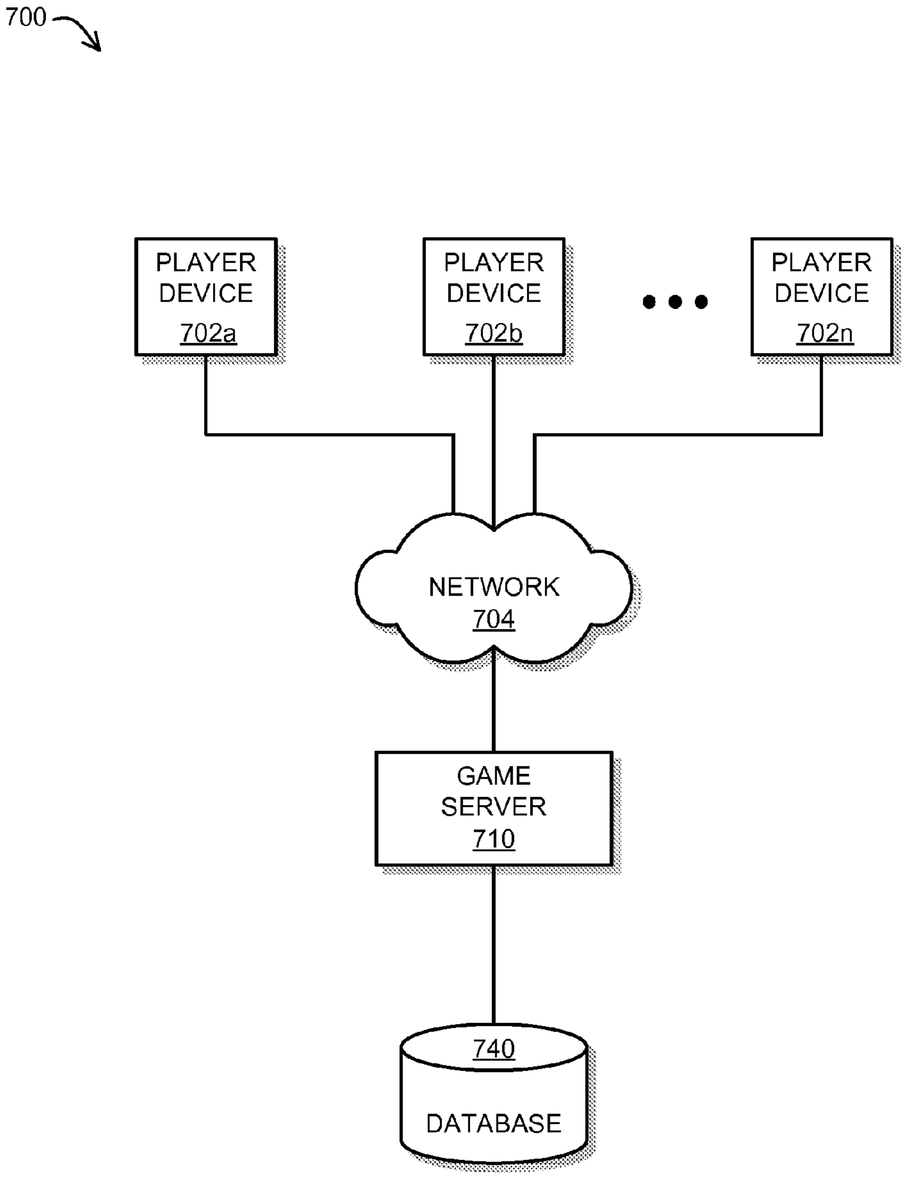
FIG. 7 is a block diagram of a system according to one or more embodiments.

Turning now to FIG. 7, a block diagram of a system 700 according to some embodiments is shown. In some embodiments, the system 700 may comprise a general gaming platform such as a gaming platform via which one or more multiplayer and/or online games may be played (e.g., one or more online games). In some embodiments, the system 700 may comprise a plurality of player devices 702*a-n* in communication with and/or via a network 704. In some embodiments, a game server 710 may be in communication with the network 704 and/or one or more of the player devices 702*a-n*. In some embodiments, the game server 710 (and/or the player devices 702*a-n*) may be in communication with a database 740.

In contrast to the specialized, respective bingo game systems of FIG. 1 and FIG. 2, and to the specialized game systems of FIG. 3, FIG. 4, and FIG. 5, the system 700 may be embodied using one or more general computing devices executing software (e.g., bingo game software).

The player devices 702*a-n*, in some embodiments, may comprise any type or configuration of electronic, mobile electronic, and or other network and/or communication devices (or combinations thereof) that are or become known or practicable. A first player device 702*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 702*a-n* may be specifically utilized and/or configured (e.g., via specially-programmed and/or stored instructions such as may define or comprise a software application) to communicate with the game server 710 (e.g., via the network 704). In some embodiments, a game server 710 may be in communication with a variety of different types of player devices 702*a-n*.

The network 704 may, according to some embodiments, comprise a LAN, WAN, cellular telephone network, Bluetooth® network, NFC network, and/or RF network with communication links between the player devices 702*a-n*, the game server 710, and/or the database 740. In some embodiments, the network 704 may comprise direct communications links between any or all of the components 702*a-n*, 710, and 740 of the system 700. The game server 710 may, for example, be directly interfaced or connected to the database 740 via one or more wires, cables, wireless links, and/or other network components, such network components (e.g., communication links) comprising portions of the network 704. In some embodiments, the network 704 may comprise one or many other links or network components other than those depicted in FIG. 7. A second player device 702*b* may, for example, be connected to the game server 710 via various cell towers, routers, repeaters, ports, switches, and/or other network components that comprise the Internet and/or a cellular telephone (and/or Public Switched Telephone Network (PSTN)) network, and which comprise portions of the network 704.

While the network 704 is depicted in FIG. 7 as a single object, the network 704 may comprise any number, type, and/or configuration of networks that is or becomes known or practicable. According to some embodiments, the network 704 may comprise a conglomeration of different sub-networks and/or network components interconnected, directly or indirectly, by the components 702*a-n*, 710, and 740 of the system 700. The network 704 may comprise one or more cellular telephone networks with communication links between the player devices 702*a-n* and the game server 710, for example, and/or may comprise the Internet, with communication links between the player devices 702*a-n* and the database 740, for example.

According to some embodiments, the game server 710 may comprise a device (and/or system) owned and/or operated by or on behalf of or for the benefit of a gaming entity (not explicitly shown). The gaming entity may utilize player and/or game information or instructions (e.g., stored by the database 740), in some embodiments, to host, manage, analyze, design, define, price, conduct, and/or otherwise provide (or cause to be provided) one or more games such as online multiplayer games (e.g., one or more bingo games as described in this disclosure). In some embodiments, the gaming entity (and/or a third-party; not explicitly shown) may provide an interface (not shown in FIG. 7) to and/or via the player devices 702*a-n*. The interface may be configured, according to some embodiments, to allow and/or facilitate electronic game play by one or more players. In some embodiments, the system 700 (and/or interface provided by the game server 710) may present game data (e.g., from the database 740) in such a manner that allows players to participate in one or more online games (singularly, in/with groups, and/or otherwise). According to some embodiments, the game server 710 may cause and/or facilitate various functionality and/or features of one or more bingo games, each as described in this disclosure.

In some embodiments, the database 740 may comprise any type, configuration, and/or quantity of data storage devices that are or become known or practicable. The database 740 may, for example, comprise an array of optical and/or solid-state hard drives configured to store player and/or game data, and/or various operating instructions, drivers, etc. While the database 740 is depicted as a standalone component of the system 700 in FIG. 7, the database 740 may comprise multiple components. In some embodiments, a multi-component database 740 may be distributed across various devices and/or may comprise remotely dispersed components. Any or all of the player devices 702*a-n* may comprise the database 740 or a portion thereof, for example, and/or the game server 710 may comprise the database 740 or a portion thereof.

Figure 8:
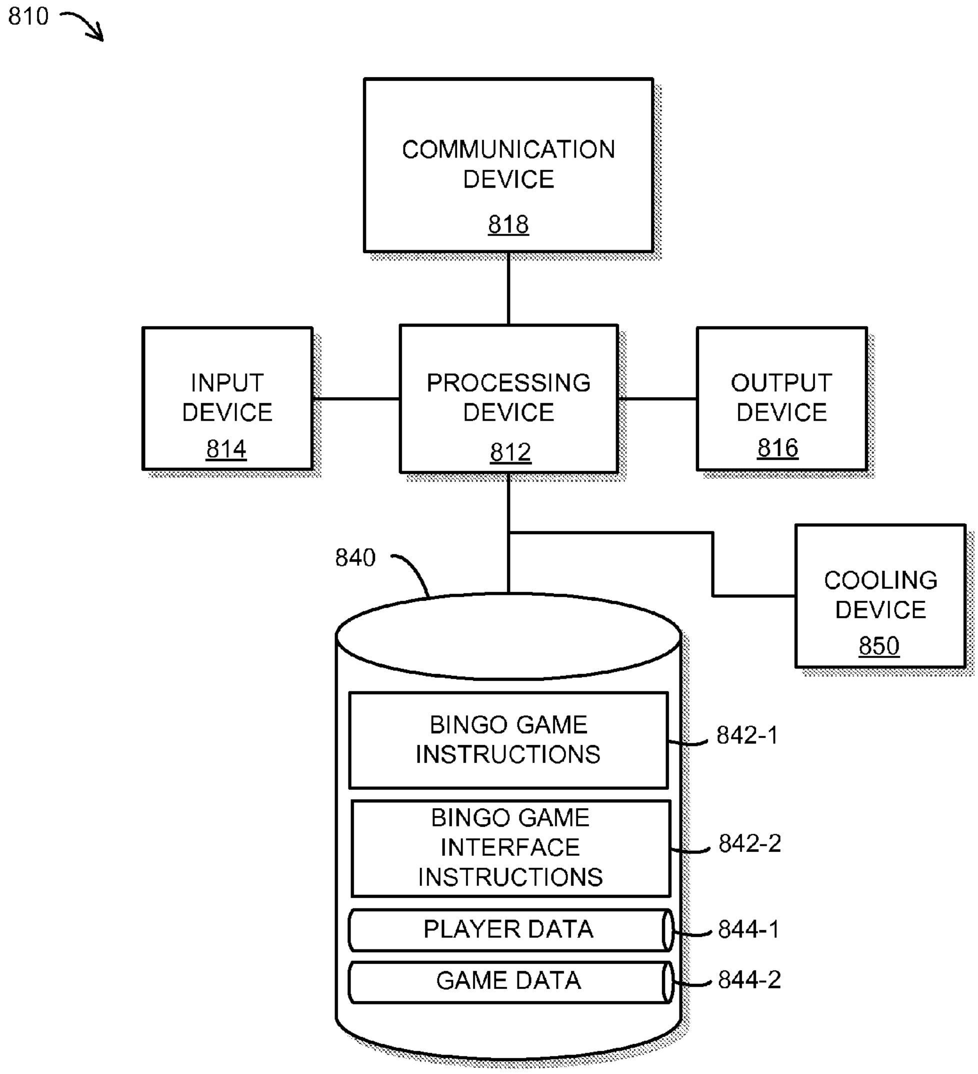
FIG. 8 is a block diagram of an apparatus according to one or more embodiments.

Turning to FIG. 8, a block diagram of an apparatus 800 according to some embodiments is shown. In some embodiments, the apparatus 800 may be similar in configuration and/or functionality to any of the player and/or user devices 130, 140, 210, 302*a-n*, 402*a-b*, 502, 602, 702*a-n* and/or the servers and/or controller devices 102, 106, 108, 114, 118, 310*a-n*, 410*a-g*, 510*e-f*, 610*a-j*, 710 of FIG. 1, FIG. 2, FIG. 3, FIG. 4, FIG. 5, FIG. 6, and/or FIG. 7 in this disclosure, and/or may otherwise comprise a portion of the systems 100, 200, 300, 400, 500, 600, 700 of FIG. 1, FIG. 2, FIG. 3, FIG. 4, FIG. 5, FIG. 6, and/or FIG. 7 in this disclosure. The apparatus 800 may, for example, execute, process, facilitate, and/or otherwise be associated with the methods 900 (FIG. 9), 1000 (FIG. 10), and 1100 (FIG. 11) described in this disclosure. In some embodiments, the apparatus 800 may comprise a processing device 812, an input device 814, an output device 816, a communication device 818, a memory device 840, and/or a cooling device 850. According to some embodiments, any or all of the components 812, 814, 816, 818, 840, 850 of the apparatus 800 may be similar in configuration and/or functionality to any similarly named and/or numbered components described in this disclosure. Fewer or more components 812, 814, 816, 818, 840, 850 and/or various configurations of the components 812, 814, 816, 818, 840, 850 may be included in the apparatus 800 without deviating from the scope of embodiments described in this disclosure.

According to some embodiments, the processing device 812 may be or include any type, quantity, and/or configuration of electronic and/or computerized processor that is or becomes known. The processing device 812 may comprise, for example, an Intel® IXP 2800 network processor or an Intel® XEON™ processor coupled with an Intel® E7501 chipset. In some embodiments, the processing device 812 may comprise multiple inter-connected processors, microprocessors, and/or micro-engines. According to some embodiments, the processing device 812 (and/or the apparatus 800 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 800 comprises a server such as a blade server, necessary power may be supplied via a standard AC outlet, power strip, surge protector, a PDU, and/or Uninterruptible Power Supply (UPS) device.

In some embodiments, the input device 814 and/or the output device 816 are communicatively coupled to the processing device 812 (e.g., via wired and/or wireless connections and/or pathways) and they may generally comprise any types or configurations of input and output components and/or devices that are or become known, respectively. The input device 814 may comprise, for example, a keyboard that allows an operator of the apparatus 800 to interface with the apparatus 800 (e.g., by a player, such as to participate in an online game session as described in this disclosure). In some embodiments, the input device 814 may comprise a sensor configured to provide information such as player relationships to the apparatus 800 and/or the processing device 812. The output device 816 may, according to some embodiments, comprise a display screen and/or other practicable output component and/or device. The output device 816 may, for example, provide a game interface (not explicitly shown in FIG. 8) to a player (e.g., via a website). According to some embodiments, the input device 814 and/or the output device 816 may comprise and/or be embodied in a single device such as a touch-screen monitor.

In some embodiments, the communication device 818 may comprise any type or configuration of communication device that is or becomes known or practicable. The communication device 818 may, for example, comprise a network interface card (NIC), a telephonic device, a cellular network device, a router, a hub, a modem, and/or a communications port or cable. In some embodiments, the communication device 818 may be coupled to provide data to a player device (not shown in FIG. 8), such as in the case that the apparatus 800 is utilized to provide a game interface to a player as described in this disclosure. The communication device 818 may, for example, comprise a cellular telephone network transmission device that sends signals indicative of game interface components to customer and/or subscriber handheld, mobile, and/or telephone device. According to some embodiments, the communication device 818 may also or alternatively be coupled to the processing device 812. In some embodiments, the communication device 818 may comprise an IR, RF, Bluetooth™, and/or Wi-Fi® network device coupled to facilitate communications between the processing device 812 and another device (such as a player device and/or a third-party device).

The memory device 840 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of bingo game instructions 842-1 and/or bingo game interface instructions 842-2. In some embodiments, the bingo game instructions 842-1 and/or the bingo game interface instructions 842-2 may be utilized by the processing device 812 to provide output information via the output device 816 and/or the communication device 818.

According to some embodiments, the bingo game instructions 842-1 may be operable to cause the processing device 812 to process player data 844-1 and/or game data 844-2. Player data 844-1 and/or game data 844-2 received via the input device 814 and/or the communication device 818 may, for example, be analyzed, sorted, filtered, decoded, decompressed, ranked, scored, plotted, and/or otherwise processed by the processing device 812 in accordance with the game instructions 842-1.

In some embodiments, the bingo game interface instructions 842-2 may be operable to cause the processing device 812 to process player data 844-1 and/or game data 844-2. Player data 844-1 and/or game data 844-2 received via the input device 814 and/or the communication device 818 may, for example, be analyzed, sorted, filtered, decoded, decompressed, ranked, scored, plotted, and/or otherwise processed by the processing device 812 in accordance with the interface instructions 842-2.

In some embodiments, player data 844-1 and/or game data 844-2 may be utilized by the processing device 812 in accordance with the bingo game interface instructions 842-2 to provide one or more game interfaces in accordance with embodiments described in this disclosure (e.g., displaying or otherwise transmitting information about one or more lucky bingo symbols, called bingo numbers, and/or winning combinations of bingo symbols).

Any or all of the exemplary instructions and data types described in this disclosure and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 800. According to some embodiments, the memory device 840 may be incorporated into and/or otherwise coupled to the apparatus 800 (e.g., as shown) or may simply be accessible to the apparatus 800 (e.g., externally located and/or situated).

In some embodiments, the apparatus 800 may comprise a cooling device 850. According to some embodiments, the cooling device 850 may be coupled (physically, thermally, and/or electrically) to the processing device 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 800.

One or more various types of data storage devices may be utilized to store instructions and/or data for use in accordance with one or more embodiments. In some embodiments, instructions stored on the data storage devices may, when executed by a processing device, cause the implementation of and/or facilitate one or more of various methods, and/or portions or combinations thereof, as described in this disclosure.

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the first data storage device and/or the data storage medium may be configured to store information utilizing one or more magnetic, inductive, and/or optical means (e.g., magnetic, inductive, and/or optical-encoding). A data storage medium, for example, may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB keyfob, dongle, and/or other type of flash memory data storage device that is or becomes know or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Any one or more of various types of data storage devices may generally store program instructions, code, and/or modules that, when executed by a processing device, cause a particular machine to function in accordance with one or more embodiments described in this disclosure. Some types of data storage devices may be representative of a class and/or subset of computer-readable media that are defined in this disclosure as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols. For a more exhaustive list of protocols, the term "network" is defined above and includes many exemplary protocols that are also applicable in this disclosure.

In some embodiments, one or more specialized machines such as a computerized processing device, a server, a remote terminal, and/or a customer device may implement one or more of the various practices described in this disclosure. A computer system of a gaming entity may, for example, comprise various specialized computers that interact to provide for online games as described in this disclosure.

B. Methods

According to some embodiments, processes described in this disclosure may be performed and/or implemented by and/or otherwise associated with one or more specialized and computerized processing devices (e.g., the devices 130, 140, 302*a-n*, 402*a-b*, 502, 602 and/or the servers and/or controller devices 102, 108, 110, 114, 118, 124, 310*a-n*, 410*a-g*, 510*e-f*, 610*a-j* of FIG. 1, FIG. 3, FIG. 4, FIG. 5, and/or FIG. 6 in this disclosure), specialized computers, computer terminals, computer servers, computer systems and/or networks, and/or any combinations thereof (e.g., by one or more online game providers and/or online gaming player processing devices). In some embodiments, methods may be embodied in, facilitated by, and/or otherwise associated with various specialized input mechanisms and/or interfaces described in this disclosure. In contrast, according to some other embodiments, some processes described in this disclosure may be performed and/or implemented by and/or otherwise associated with one or more general computing devices (e.g., as described with respect to FIG. 7 in this disclosure), servers, systems, and/or networks.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 9:
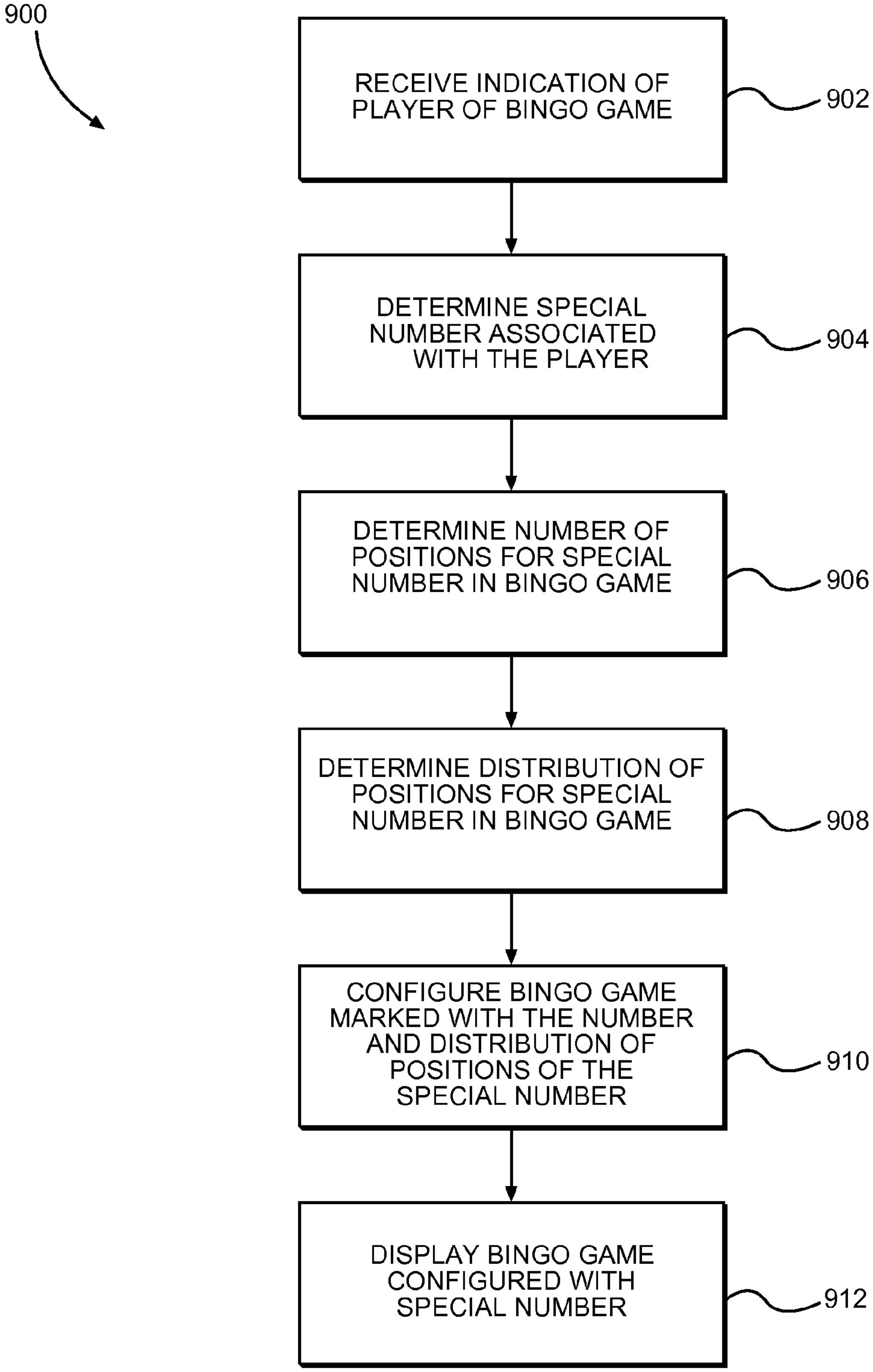
FIG. 9 is a flowchart of a method according to one or more embodiments.

Referring now to FIG. 9, a flow diagram of a method 900 according to some embodiments is shown. The method 900 may be performed, for example, by a bingo game server (e.g., a bingo game server of bingo game server cluster 110).

According to some embodiments, the method 900 may comprise receiving an indication of a player of a bingo game, at 902. In one example, receiving an indication of a player of a bingo game may comprise receiving such indication through an online bingo gaming platform (e.g., bingo game system 100). For example, when a player logs on to the bingo gaming platform, or registers with the bingo gaming platform, the bingo gaming platform may receive a signal, request, inquiry, solicitation or some other form of communication or alert indicating that a player wishes to play a bingo game. In one embodiment, receiving an indication of a player may comprise the payment of fees, for example, through cash, credit, chips, or other form of tender, to join or initiate a bingo game.

According to some embodiments, the method 900 may comprise determining a special number associated with the player, at 904. One or more special numbers may be chosen by the player, or may be chosen for or on behalf of the player, in accordance with several embodiments, some of which are discussed below, by way of example.

According to some embodiments, determining a special number or special numbers associated with the player may comprise receiving an indication of the special number from the player. In one embodiment, the special number may be input by and/or received from the player, for example, by way of an input device. Examples of such input devices may include any personal device, mobile device, computing device, kiosk, or other interactive device allowing a player to inform a gaming server that the special number may be associated with the player. In another embodiment, the special number can be received through a database, website, magnetic strip, radio frequency identification chip, USB device, identification card, or any other form of electronic storage media capable of storing a special number associated with a player.

According to some other embodiments, a special number or special numbers may be determined for or on behalf of a player. For example, special numbers can be generated by a gaming server, random number generator, computing device, processor, memory device, mobile device, weighted random array, or by a third person.

In some embodiments, a special number or special numbers associated with a player may be chosen randomly, and/or based on personal information associated with the player. For example, a gaming server (e.g., a bingo game server) may access electronic storage media containing data about a player, and use the data to determine a special number associated with the player. In one embodiment, the player may be assigned more than one special number if the player has a history of playing games on the gaming server (e.g., if the player meets a minimum threshold for number of games previously played). In other embodiments, one or more special numbers may be assigned to a player based on, for example, how many bingo games the player purchased or how long a player has been logged into the gaming server (e.g., based on corresponding required minimums).

According to some embodiments, the special number can be any number, or plurality of numbers, from 1 to 9. According to other embodiments, the special number can be any single-digit number from 0 to 9, and any larger number that may comprise the special single-digit number—by way of example, if a player chose 8 as his or her special number for 90-ball bingo, any number from 1 to 90 containing the number 8 (e.g., 8, 18, 28, 38, 48, 58, 68, 78, 80, 81, 82, 83, 84, 85, 86, 87, 88, and 89) would also be considered the player's special numbers. According to other embodiments, the special number can be any single or double-digit number or numbers from 1 to 90. Various ways in which special numbers may be utilized during bingo game play are described in this disclosure.

In one or more embodiments, determining a special number may be performed prior to the beginning of a bingo game session and/or prior to purchase of one or more bingo cards. In one embodiment, upon joining or initiating a game session, a player may be allowed to indicate a special number or special numbers that the player wishes to use for bingo game play. In one example, the player may log onto a gaming server via a website or a mobile gaming application via an input device, and indicate a special number prior to bingo game play.

In other embodiments, a player may choose to input a special number, or choose a different special number, during or after game play. For example, if a player did not choose a special number before initiating game play, a player can input a special number, or have a special number generated, during game play. In other embodiments, a player may decide to play more than one special number including, without limitation, one chosen or generated before game play, and another chosen or generated during game play. In other embodiments, a player may determine it is beneficial to change a special number during game play, and may do so in accordance with some embodiments in this disclosure.

In accordance with one or more embodiments, it is advantageous for a special number to appear on multiple positions on a bingo game interface. For example, the more frequent a special number appears on a bingo game interface, the more positions on the bingo game interface can be daubed if the special number is called during bingo game play.

According to some embodiments, the method 900 may comprise determining a number of positions for the special number in the bingo game, at 906. In one example, determining a number of positions for the special number in the bingo game may comprise determining the number based on a weighted random array. According to some embodiments, a player with a long history of playing bingo games on the gaming server may be rewarded by the gaming server by assigning more positions for his or her special number. For example, the number of times a special number appears on a bingo game interface may vary, for example, in accordance with the number of tickets the player purchases, the outcome of one or more previous games, the amount of time the player has logged onto a gaming server, the amount of money a player has spent playing bingo games, and/or other relevant information.

In accordance with one or more embodiments, the distribution of the positions of the special number on a bingo game interface may confer certain advantages during game play. For example, if a certain distribution of positions for a special number creates a winning pattern if the special number is called during game play, that distribution would be advantageous over other distributions that do not create such a winning pattern.

According to some embodiments, the method 900 may comprise determining the distribution of positions for the special number in the bingo game, at 908. In one example, determining the distribution of positions for the special number in the bingo game may comprise determining the number based on a weighted random array. According to some embodiments, a player with a long history of playing bingo games on a bingo gaming server may be rewarded by the bingo gaming server by assigning a more advantageous distribution of positions for the special number. For example, advantageous distribution patters may be awarded based on the number of tickets a player purchases, the outcome of one or more previous games, the amount of time the player has logged onto a gaming server, the amount of money a player has spent playing bingo games, and/or other relevant information.

As noted above, in accordance with some embodiments a weighted random array may be used to determine the number of and/or distribution of the special number to be generated on a bingo game interface. According to some embodiments, the weighted random array may be embodied in a processor, a memory (e.g., in database 104), a mobile device, or other device that is associated with a bingo game, and/or a bingo game server.

The method 900 may further comprise configuring a bingo game marked with the number and distribution of the positions of the special number, at 910. In at least one embodiment, one or more special numbers on a bingo game interface may be marked, for example, in accordance with the number of positions and the distribution of the positions of the special number on the bingo game interface. In one or more embodiments, at least one symbol may be generated to represent the positions of the special number as distributed on the bingo game interface. In one or more embodiments, the symbol can be a graphical depiction of the special number, depictions of other things such as inanimate objects or living things, specific shapes, highlighting, colors, pictures, or any other symbol or depiction that sets apart the positions of the special numbers relative to the positions of other numbers on the bingo game interface.

The method 900 may further comprise displaying the bingo game configured with the special number, at 912. For example, the bingo game interface may be printed on a physical bingo ticket configured to show the marked positions of the special number. In one or more embodiments, the bingo game interface may be displayed on a monitor, and LCD screen, a mobile device, a television screen, or any other electronic device which can display the bingo game interface. In at least one embodiment, the bingo game play may be displayed on a touch screen allowing players to interact with the bingo game interface. For example, a player may be able to daub the positions of numbers by touching the touch screen of the bingo game interface.

Figure 10:
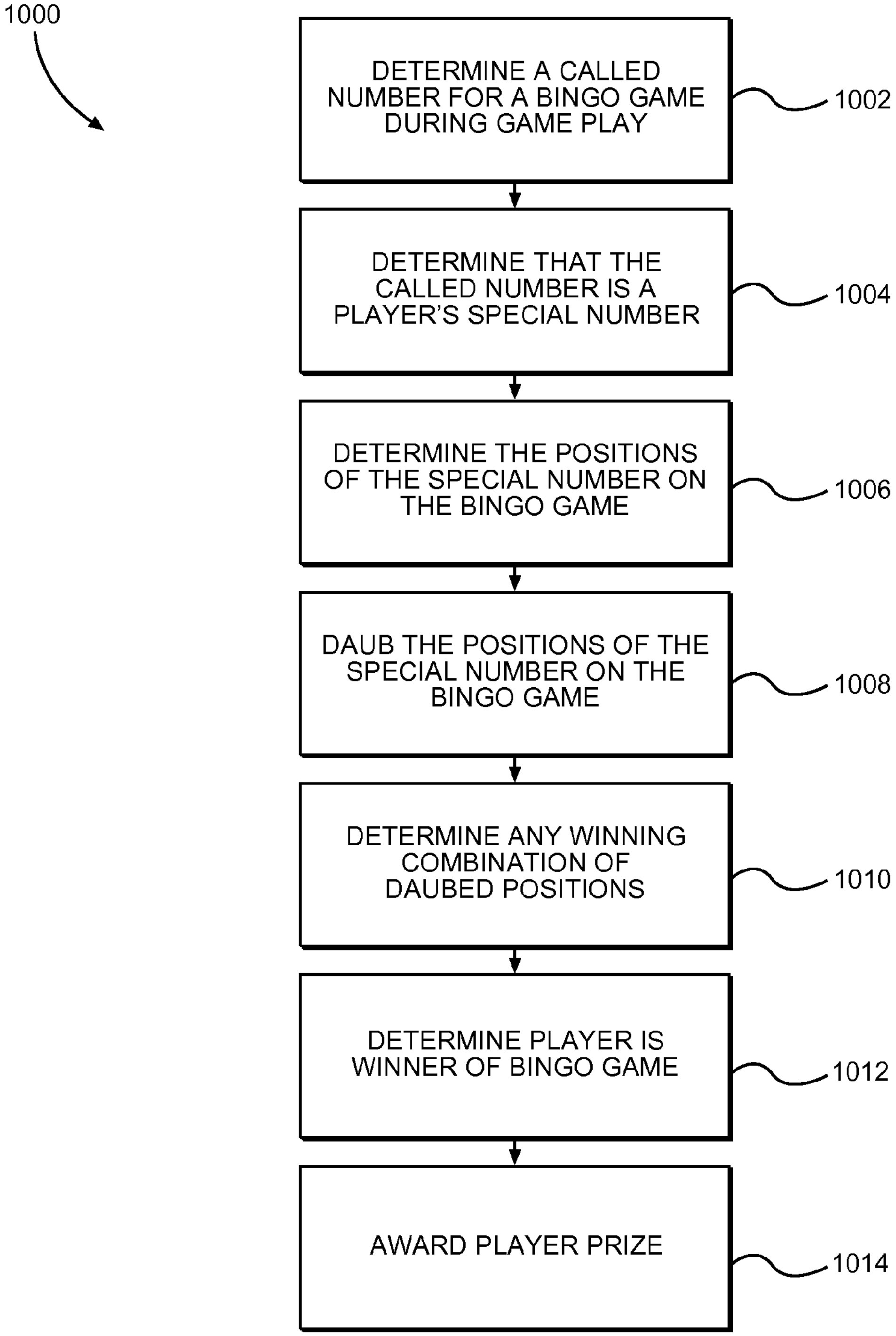
FIG. 10 is a flowchart of a method according to one or more embodiments.

Referring now to FIG. 10, the bingo game can be played according to one or more embodiments represented by method 1000. For example, as numbers are called during the normal course of bingo game play, the bingo game player, a third person, a processor, or some other device can determine whether a called number is the player's special number, and whether the player should be awarded a prize for any winning combinations of daubed positions.

In some embodiments, the method includes a step of determining a called number for a bingo game during game play, at 1002. A number may be called, for example, during bingo play to inform players which numbers should be daubed on a bingo interface. In some embodiments, numbers may be called by a person, gaming server, processing device, mobile device, computing device, electronic or mechanical number generator, and/or any other device or thing capable of generating numbers for a bingo game.

Determining a called number may be accomplished by the player, a third person, and/or a device. For example, a gaming server, processing device, mobile device, computing device, character recognition device, voice recognition device, and/or any other device capable of recognizing a number may be used to identify called numbers.

In one or more embodiments, the method may comprise a step of determining that the called number is a player's special number, at 1004. For example, once a number is called, the player, a third person, and/or a device may determine whether the called number is a special number associated with a player. In one or more embodiments, for example, a gaming server, processing device, memory device, mobile device, computing device, character recognition device, voice recognition device, and/or any other device capable of recognizing a number may be used to determine that the called number is the player's special number. In one example, a database or other stored information (e.g., a player information database, a game database) may be queried (e.g., by a bingo game server) (i) to determine whether a special number is associated with a player in the player database and/or (ii) to determine whether a called number matches a special number associated with the player.

In other embodiments, determining that the called number is a player's special number may not be necessary or desirable. For example, in some implementations a bingo game card may be configured with a player's numbers for a bingo game session (e.g., including one or more special numbers), but for the purposes of game play it is only relevant which numbers match the called numbers to determine any winning combinations.

In some embodiments, the method includes a step of determining the positions of the special number on the bingo game, at 1006. For example, if the special number is called during game play, the player, a third person, and/or a device may determine where the special number is located on the bingo game interface. In one or more embodiments, for example, a gaming server, processing device, memory device, mobile device, computing device, character recognition device, and/or any other device capable of identifying positions on a bingo game interface may be used to determine the positions of the special numbers. In one example, a database or other stored information (e.g., a game database) may be queried (e.g., by a bingo game server) to determine which positions on a bingo game card match the called number. For instance, the positions and corresponding associated numbers on a bingo game card may be stored in a game file for a particular bingo game session. In another example, if the positions of the special numbers were marked with a graphic symbol, such as a depiction of a star, a character recognition device programmed to recognize the graphic symbol could be used to identify the special numbers on the bingo game interface. The character recognition device may, for example, determine the positions of the special numbers on the bingo game interface, either alone or in combination with another device, such as the gaming server or a memory device.

In some embodiments, determining the positions of the special number may be performed prior to game play, prior to the number being called, or prior to determining that the called number is a special number. Some examples of determining positions of a special number are described with respect to method 900 of FIG. 9.

According to some embodiments, the method 1000 can include a step of daubing the positions of the special number on the bingo game, at 1008. In one or more embodiments, after a special number is called during bingo game play, and after the positions of the special number have been determined, the player, a third person, and/or a device may daub the positions of the special number on the bingo game interface. In one or more embodiments, for example, a gaming server, processing device, mobile device, computing device, character recognition device, and/or any other device capable of identifying and daubing positions on a bingo game interface may automatically daub the positions of called special numbers on the bingo game interface.

By way of example, daubing the position of a called number on a bingo game interface may be performed on physical bingo game interfaces, such as cards, tickets, placards, tables, tablets, dry-erase boards, chalk boards, or any other physical form of interface for playing bingo. In other embodiments, daubing positions may be performed on electronic bingo game interfaces, such as those provided on gaming servers, the internet or intranet, websites, gaming consoles, LCD screens, television screens, computer monitors, touch screen monitors, mobile devices, or any other form of electronic interface for playing bingo.

In one or more embodiments, daubing a position on a bingo game interface can be performed, for example, by placing a mark, symbol, highlighting, electronic label, tag, tick, check or some other form of demarcation to differentiate the daubed positions from other positions (e.g., by a player providing input via a touch-screen display device).

In some embodiments, it may be relevant to game play that a called number and/or a daubed number is a player's special number (e.g., a winning combination including a player's special number may provide a bonus prize). In other embodiments, determining that a called number is a player's special number may be desirable, for example, when the special number is a single-digit number from 0 to 9, and includes any larger number that may comprise the special, single-digit number. By way of example, if the special number is "7," and includes any larger number containing the number "7" (e.g., "17," "27," etc.), determining that a called number "7" is also a player's special number may be desirable to correctly determine and daub the positions of the special number (e.g. "7," "17," "27," etc.) on the bingo game, at 1006 and 1008.

In one or more embodiments, the method 1000 can include the step of determining any winning combination of daubed positions, at 1010. According to some embodiments, certain patterns or combinations of daubed positions may represent a winning combination for which the player may be awarded a prize. According to one or more embodiments, winning combinations may be determined by the player, a third person, and/or a device. For example, winning combinations may be determined by a gaming server, processing device, mobile device, computing device, character recognition device, and/or any other device capable of identifying positions on a bingo game interface.

By way of example, daubed positions on a bingo game interface may be marked with a graphic symbol, such as a depiction of a check mark. In some embodiments, a character recognition device programmed to recognize the graphic symbol may be used to identify daubed positions—including, for example, daubed positions of special numbers—on the bingo game interface. The character recognition device may, for example, determine the positions of the daubed positions on the bingo game interface and, either alone or in combination with another device (e.g., a gaming server, processing device, and/or a computing device), determine any winning combinations of daubed positions, at 1010.

In one or more embodiments, if a winning combination of daubed positions is determined (e.g., on a player's bingo game interface), the player may be determined a winner of the bingo game, at 1012. In one or more embodiments, the winner of a bingo game may be determined by the player, a third person, and/or a device. A winner of a bingo game may be determined, for example, by a gaming server, internet or intranet, website, processing device, mobile device, computing device, and/or any other device capable of identifying the winner of a bingo game.

In one or more embodiments, a device capable of determining a winner may be a bingo game server capable of monitoring several players' bingo game interfaces simultaneously. In one or more examples, a winner of a bingo game may be determined based on any winning combinations of daubed positions on a winning player's bingo game interface, and when these winning combinations were first achieved. For example, a first player and a second player may each achieve winning combinations of daubed positions, but if the first player achieves his or her winning combination prior to the second player, the first player may be determined the winner of the bingo game.

In one or more embodiments, the method 1000 may include awarding the player a prize, at 1014. In one or more embodiments, multiple player prizes may be awarded. For example, a first, a second, and a third player may each be awarded a player prize based on when each of the players achieved a winning combination of daubed positions on their player interfaces. The multiple player prizes may be equivalent, or may differ based on the combinations of daubed positions, and when the combinations were achieved.

According to some embodiments, a method may comprise determining a number of instances of a special number to use (e.g., during bingo play), and/or determining a distribution of the number of instances of the special number (e.g., on a bingo game interface).

Figure 11:
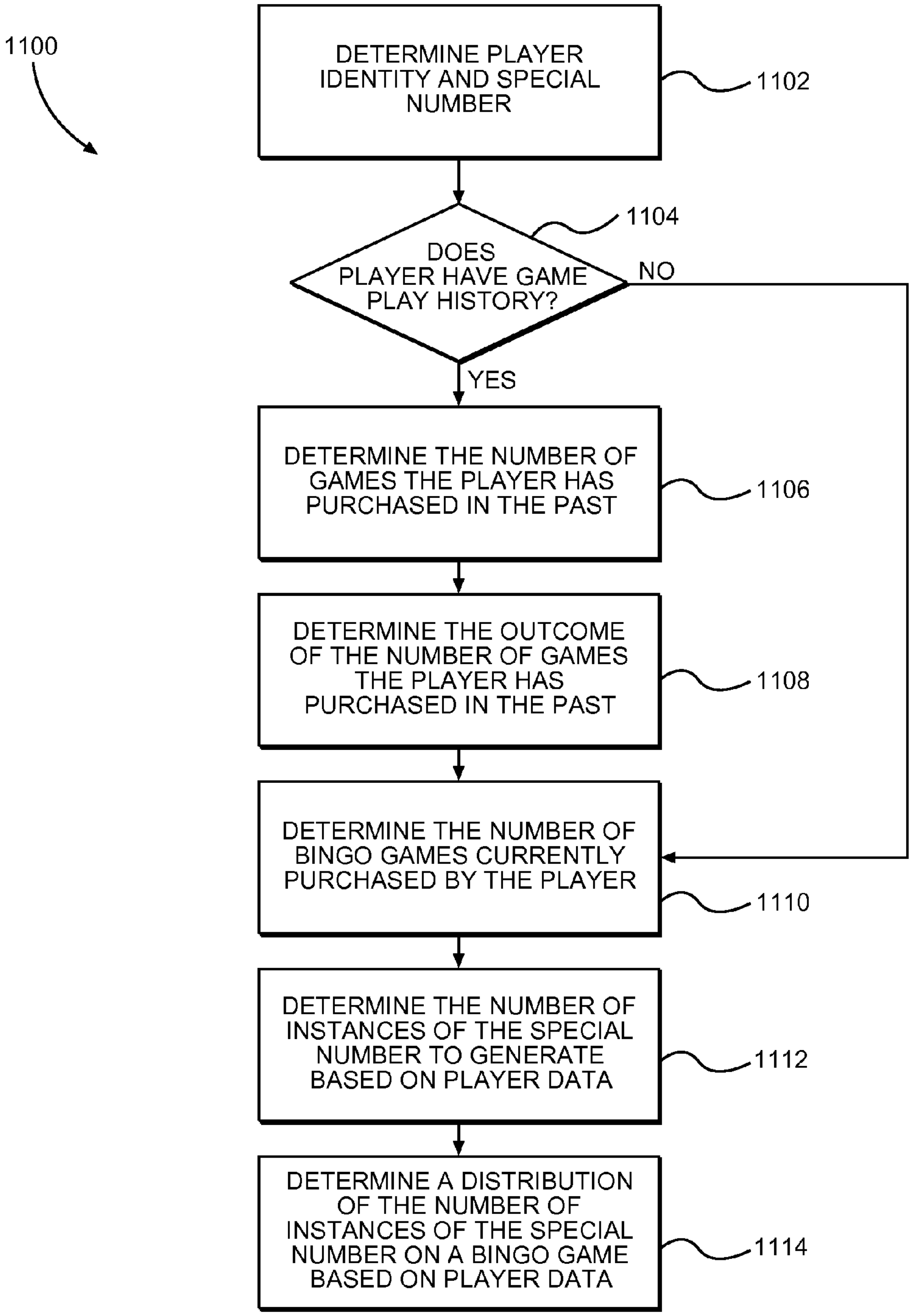
FIG. 11 is a flowchart of a method according to one or more embodiments.

Referring now to FIG. 11, a flow diagram of a method 1100 according to some embodiments is shown. Method 1100 may be performed, for example, by a server computer (e.g., a gaming server). It should be noted that any and all of the steps may be performed by a single computing device which may be a mobile device, desktop computer, or another computing device, or multiple such devices. Further any steps described in this disclosure as being performed by a particular computing device may, in some embodiments, be performed by a human or another computing device as appropriate.

According to some embodiments, the method 1100 may comprise determining an identity of a player and the player's special number can be determined, at 1102. For example, information identifying a player can be input manually by a player or a third person, or stored on a personal identification card, USB device, memory device or any other storage device used to identify a player or initiate game play, at 1102. In some embodiments, a player's identity and/or special number can be retrieved from a player's identifying information, input by the player, or otherwise provided by a computing device or a third person.

In one or more embodiments, the method 1100 can include a step of determining whether the player has a game play history, at 1104. In one or more embodiments, the player's personal data can be interrogated to determine if the player has a history of bingo game play, for example, with a particular bingo gaming platform. In some embodiments, a processor, mobile device, or any other electronic device or third person can interrogate the player's personal data for information including, for example, the number of bingo games the player has purchased in the past, at 1106, and/or the outcome of the number of games the player has purchased in the past, at 1108.

The method 1100 may comprise determining a number of instances of the special number to generate based on the player data, at 1112. The method of 1100 may also determine the distribution of the number of instances of the special number on a bingo game based on the player data, at 1114. In one or more examples, if a first player has purchased and/or played a greater number of games in the past than a second player, the first player may be awarded a greater number of instances of a special number, at 1112, and/or a more favorable distribution of the number of instances of the special number, at 1114.

Similarly, in one or more examples, if a first player has what may be considered more favorable outcomes of the games purchased and/or played by the first player than a second player, at 1108, the first player may be awarded a greater number of instances of a special number, at 1112, and/or a favorable distribution of the number of instances of the special number, at 1114.

The method 1100 may also include a step, for example, of determining the number of bingo games currently purchased by the player, at 1110. For example, if a player purchases more than one bingo game, the player may be awarded a greater number of instances of a special number, at 1112, and/or a favorable distribution of the number of instances of the special number, at 1114, on the games currently purchased.

The number of bingo games currently purchased by a player may be determined together with a player's game play history. For example, the number of bingo games currently purchased by the player, at 1110, may be considered together with the number of games the player has purchased in the past, at 1104, and the outcome of the number of games the player has purchased in the past, at 1108, to determine the number of instances of a special number, at 1112, and/or a favorable distribution of the number of instances of the special number, at 1114.

Determining the number of bingo games currently purchased by a player, at 1110, may also be determined, for example, if it is determined that a player does not have a player history, at 1104, or a player's history is otherwise unavailable. For example, if a player does not have a history of game play, the player may still be awarded a greater number of instances of a special number, at 1112, and/or a favorable distribution of the number of instances of the special number, at 1114, if the player purchases more than one bingo game (or meets some other predetermined minimum purchase threshold). Thus, in one or more embodiments, a first player with a game play history may not be awarded any competitive advantage over a second player without a game play history, if the second player purchases a sufficient number of bingo games.

It should be noted that FIG. 11 does not encompass all possible steps, or all possible player history data that may be searched or interrogated, to determine the number of instances of a special number to generate, or to determine the distribution of the number of instances of the special number on a bingo game. Any particular steps described in this disclosure are provided by way of example only, and in some embodiments, may be excluded, replaced, or used in addition to other steps useful for determining the number of instances of a special number to use, and the distribution of the number of instances of the special number on a bingo game interface.

Figure 12:
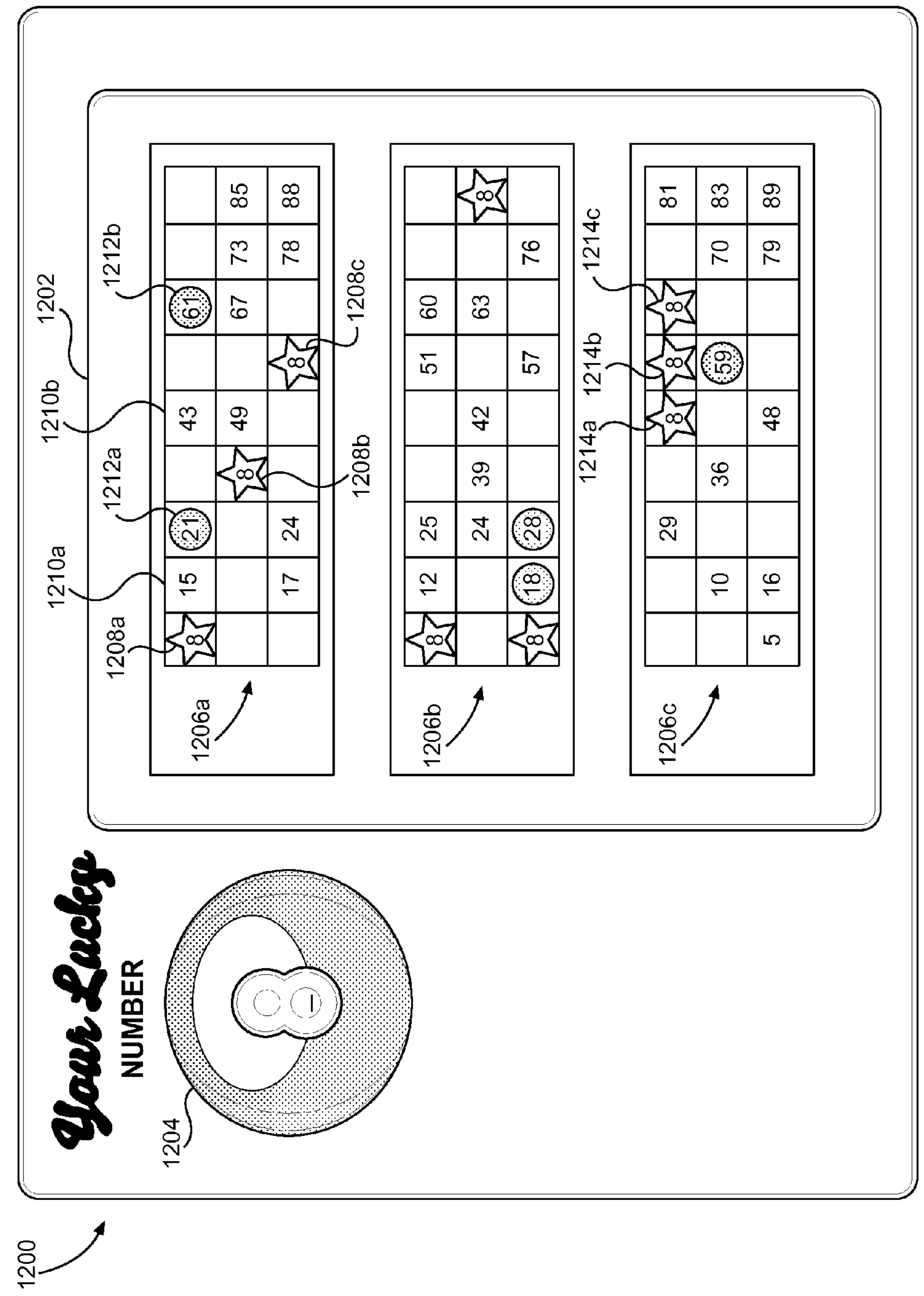
FIG. 12 is an example interface according to some embodiments.

According to one example of a bingo game including a feature of a special number associated with a player, as depicted in the example interface 1200 of FIG. 12, a player may choose, for example, "8" as his lucky number prior to, during, or after the purchase of one or more bingo games. In some examples, the bingo game interface 1200 may be displayed on physical non-electronic media, such as a bingo ticket, gaming board, or other form of physical media for displaying the bingo game interface, and/or displayed on electronic media such as a video screen, monitor, LCD, mobile device, television screen, or any other electronic device which can display the bingo game interface. In some examples, the lucky number may be printed or displayed, at 1204, on the bingo game interface.

In some embodiments, multiple bingo game tickets, at **1206*a*, 1206*b* and 1206*c*, may be purchased and displayed together in a single display window, at 1202. The bingo game tickets 1206*a*, 1206*b* and 1206*c* may, for example, be played simultaneously in one bingo game. In other embodiments, the bingo game tickets may be played individually, for example with 1206*a*, 1206*b* and 1206*c* each representing separate bingo game, and/or may be played in any number of multiples, for example with 1206*a* and 1206*b* representing one game, and 1206*c*** representing another game.

In some embodiments, one or more special positions on the tickets are marked (e.g., by a processor executing a software application for an on-line bingo game) with the lucky number (e.g. "8"), and/or a graphic symbol, such as a depiction of a star representing the lucky number positions, at **1208*a*, 1208*b*, and 1208*c*. As numbers are called during bingo game play, the positions of numbers on the bingo game interface that coincide with called numbers may be daubed (e.g. automatically by a processing device or manually by a player), for example, with a second graphic symbol, such as a shaded circle, at 1212*a* and 1212*b*. This second graphic symbol representing daubed positions may, for example, be chosen so that the daubed positions of called numbers are easily distinguishable from the undaubed positions of uncalled numbers, at 1210*a* and 1210*b*, and of uncalled special numbers, at 1208*a*, 1208*b* and 1208*c***.

As depicted in FIG. 12, for example, multiple positions of the displayed bingo tickets for an example 90-ball bingo game are displayed with an "8," the player's lucky number. According to the example, the top row of the bingo ticket, at **1206*c*, has been generated, advantageously for the player, with three special positions corresponding to the player's lucky number, at 1214*a*, 1214*b* and 1214*c***. If an "8" is called during bingo game play, the player will be able to daub (or have daubed automatically) three spots in the top row at once.

Figure 13:
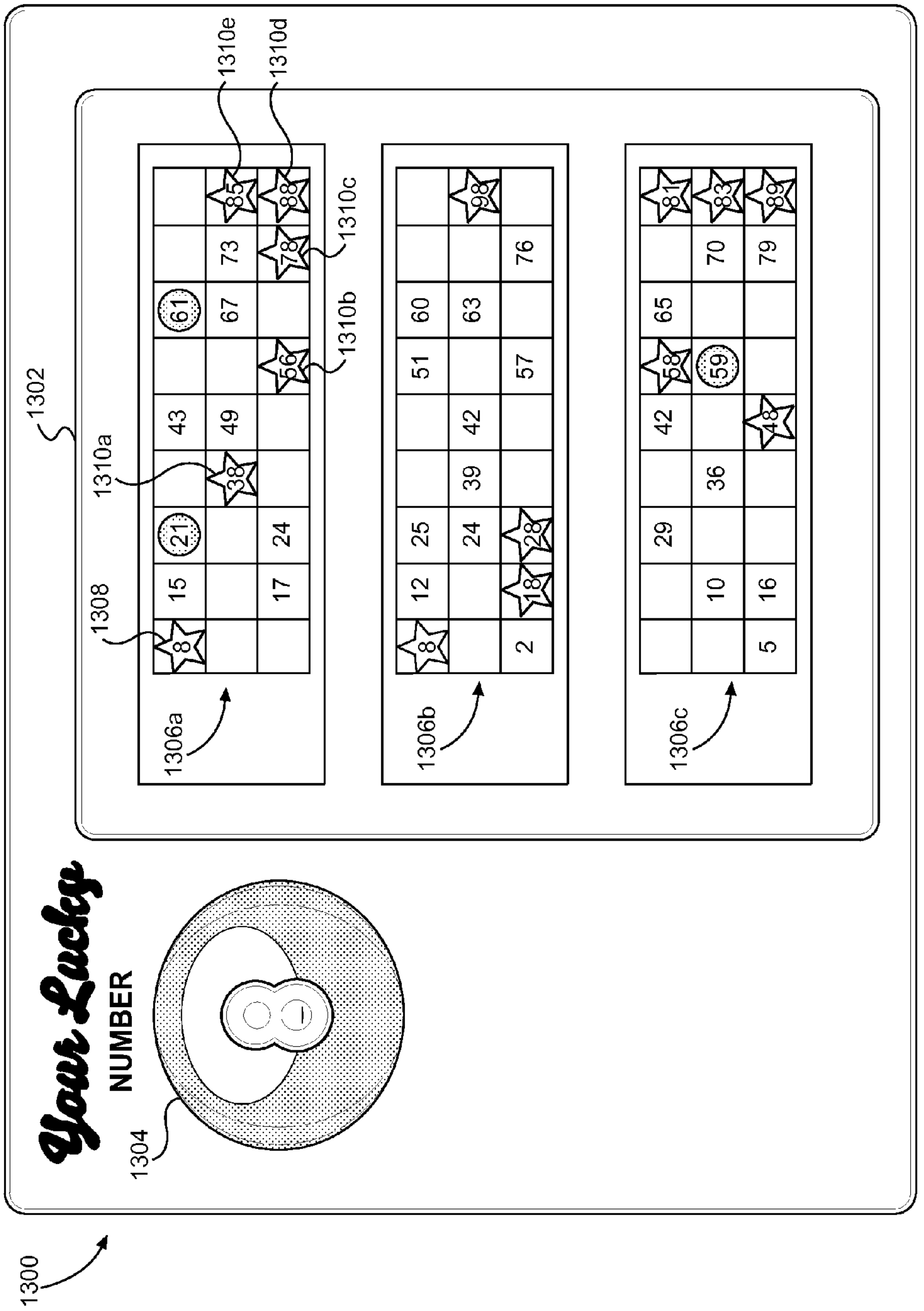
FIG. 13 is an example interface according to some embodiments.

According to some embodiments, as depicted in the example interface 1300 of FIG. 13, all positions or numbers containing a selected lucky number, numeral, or digit may be generated and/or marked on a bingo ticket display window, at 1302, displaying bingo tickets **1306*a*, 1306*b* and 1306*c*. For example, as depicted in FIG. 13, if a player selects the number "8" as his lucky number, at 1304, any position including the number "8" on the bingo ticket 1306*a* may be marked as a special position, at 1308, 1310*a*, 1310*b***,

1310*c*, 1310*d* and 1310*e*. In the depicted example, if the number 8 is called during play, all positions that include the number 8 and/or any specially marked positions may be daubed at once, for example, by a player or automatically. For example, any of the numbers 8, 18, 28, 38, 48, 58, 68, 78, 80, 81, 82, 83, 84, 85, 86, 87, 88 and 89 that may be generated and/or specially marked based on the player's lucky number "8" for a 90-ball bingo game, may be daubed at once if the number 8 is called during game play.

Social and/or wagering games of various types of such as online, offline, skill-based, games of chance, and games of mixed skill and chance are a continued source of entertainment to game players, and are often a source of great revenue for gaming companies. Some of the most popular styles of games, and some of the most consistently lucrative for the gaming industry, are bingo games. Accordingly, in addition to the various technical innovations (e.g., specialized bingo game platforms, systems, and servers) described in this disclosure, the inventors have further recognized that there is a desire to provide players with increasingly newer, more interesting, engaging, or entertaining bingo games.

Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided in this disclosure, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate," "alternative," and/or "alternate embodiment" is intended to connote one or more possible variations—not mutual exclusivity. In other words, it is expressly contemplated that "alternatives" described in this disclosure may be utilized and/or implemented together, unless they inherently are incapable of being utilized together.

The terms "including," "comprising" and variations thereof mean "including but not limited to," unless expressly specified otherwise.

The terms "a," "an," and "the" mean "one or more," unless expressly specified otherwise.

The term "plurality" means "two or more," unless expressly specified otherwise.

The terms "herein" or "in this disclosure" mean "in the present application, including the specification, its claims and figures, and anything which may be incorporated by reference, unless expressly specified otherwise."

The phrase "at least one of," when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on," unless expressly specified otherwise. In other words, the phrase "based on" describes both "based only on" and "based at least on." In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used in this disclosure only to precede a clause or other set of words that express only the intended result, objective, or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein," as utilized in this disclosure, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget," so as to encompass embodiments in which (1) the "first widget" is or is the same as the "second widget" and (2) the "first widget" is different than or is not identical to the "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described in this disclosure may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described in this disclosure. According to some embodiments, a "processor" may primarily comprise and/or be limited to a specific class of processors referred to in this disclosure as "processing devices." "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. § 101.

The term "computer-readable medium" refers to any medium that participates in providing data (e.g., instructions or other information) that may be read by a computer, a processor, or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system for providing game play to mobile devices, comprising a game server in communication with a memory device and a cloud-based cache;

a controller in communication with the game server and with the memory device;

a game webserver in communication with the game server, at least one mobile client device, at least one desktop device, and the cloud-based cache;

a bingo broadcaster in communication with the at least one desktop client device, a bingo listener, and the game sever, a bingo connection proxy in communication via a message broker with the bingo listener and with the at least one mobile client device; and the memory device storing bingo game instructions and player interface instructions which, when executed by the game server, direct the game server to perform a method comprising:

receiving an indication of a player of a bingo game;

receiving a special number associated with the player of the bingo game;

determining, using a first weighted random array, a number of positions on a ticket of the bingo game with which to associate the special number associated with the player, determining, using a second weighted random array, a distribution of the number of positions on the ticket of the bingo game;

determining positions of the special number on the ticket of the bingo game based on the determined distribution of the number of positions;

marking the determined positions of the special number on the ticket of the bingo game with an indicia of the special number;

displaying, at a mobile client device using the bingo broadcaster, the bingo listener, and the bingo connection proxy, the ticket of the bingo game with the indicia of the special number;

determining that the special number is called during game play; and displaying, at the mobile client device via the bingo broadcaster, the bingo listener, and the bingo connection proxy, all of the positions of the special number on the ticket of the bingo game as being daubed.

2. A system for providing game play to mobile devices, comprising a game server in communication with a game interface, a memory device and a cloud-based cache;

a controller in communication with the game server and with the memory device;

a game webserver in communication with the game server, at least one mobile client device at least one desktop client device, and the cloud-based cache;

a bingo broadcaster in communication with the at least one desktop client device, a bingo listener, and the game sever, a bingo connection proxy in communication via a message broker with the bingo listener and with the at least one mobile client device; and the memory device storing bingo game instructions and game interface instructions which, when executed by the game server, direct the game server to perform a method comprising:

associating a special number with a player of a bingo game;

determining a number of instances of the special number to generate for the game interface;

determining a distribution of positions for the number of instances of the special number determined for the game interface;

associating at least one indicia associated with the distribution of positions for the game interface; and generating, at a mobile client device using the bingo broadcaster, the bingo listener, and the bingo connection proxy, an output of the game interface, the generated output including the at least one indicia associated with the distribution of positions for the game interface.

3. A method, comprising:

associating, by a game server, a special number with a player of a bingo game;

determining, by the game server, a number of instances of the special number to generate for a game interface;

determining, by the game server, a distribution of positions for the number of instances of the special number determined for the game interface;

associating, by the game server, at least one indicia associated with the distribution of positions for the game interface; and generating, by the game server at a mobile client device using a bingo broadcaster, a bingo listener, and a bingo connection proxy, an output of the game interface, the generated output including the at least one indicia associated with the distribution of positions for the bingo game interface, wherein:

the game server is in communication with the game interface, a memory device and a cloud-based cache;

a controller is in communication with the game server and with the memory device;

a game webserver is in communication with the game server, at least one mobile client device, at least one desktop client device, and the cloud-based cache;

the bingo broadcaster is in communication with the at least one desktop client device, the bingo listener and the game sever; and the bingo connection proxy is in communication via a message broker with the bingo listener and with the at least one mobile client device.

4. The method of claim 3, wherein the number of instances of the special number to generate for the game interface is based on the player's bingo playing history.

5. The method of claim 3, wherein the number of instances of the special number to generate for the game interface is based on the number of bingo games a player purchases.

6. The method of claim 3, wherein the number of instances of the special number to generate for the game interface is based on the outcome of one or more prior bingo games.

7. The method of claim 3, wherein the number of instances of the special number to generate for the game interface is based on a weighted random array.

8. The method of claim 3, wherein the distribution of positions is generated using a weighted random array.

9. The method of claim 3, wherein the number of special positions distributed on the game interface are depicted by an array of one or more symbols.

10. The method of claim 3, wherein the number of special positions distributed on the game interface are depicted by the special number.

11. The method of claim 10, wherein the special number is a whole number having a value of between 1 and 10.

12. The method of claim 11, wherein determining the number of instances of the special number having a value of between 1 and 10 to generate on the game interface incorporates any whole number greater than 10 containing the special number having a value of between 1 and 10.

13. The method of claim 3, further comprising:

receiving from the player an indication of a selection by the player of the special number.

14. The method of claim 3, wherein the special number associated with the player is generated by the game server.

15. The method of claim 3, wherein the generated output of the game interface comprises a ticket.

16. The method of claim 14, wherein marking all of the at least two instances of the special number occurs substantially simultaneously.

17. The method of claim 16, wherein marking all of the at least two instances of the special number comprises:

receiving, from the player, an instruction to mark all of the at least two instances of the special number.

18. A system for providing game play, comprising a game server in communication with a memory device and a cloud-based cache;

a controller in communication with the game server and with the memory device;

a game webserver in communication with the game server, at least one mobile client device, at least one desktop client device, and the cloud-based cache;

a bingo broadcaster in communication with the at least one desktop client device, a bingo listener, and the game sever, a bingo connection proxy in communication via a message broker with the bingo listener and with the at least one mobile client device; and the memory device storing bingo game instructions and player interface instructions which, when executed by the game server, direct the game server to perform a method comprising:

determining a special number associated with a player of a bingo game;

determining a number of instances of the special number to generate on at least one bingo ticket corresponding to the bingo game, wherein the number of instances is at least two;

generating the at least one bingo ticket for the bingo game, the generated at least one bingo ticket including the determined number of at least two instances of the special number, generating, using a random number generator, drawn numbers for the bingo game;

determining that the special number is represented in the drawn numbers for the bingo game; and marking, at a mobile client device using the bingo broadcaster, the bingo listener, and the bingo connection proxy, all of the at least two instances of the special number on the generated at least one bingo ticket in response to determining that the special number is represented in the drawn numbers for the bingo game.

19. A method, comprising:

determining, by a game server, a special number associated with a player of a bingo game;

determining, by the game server, a number of instances of the special number to generate on at least one bingo ticket corresponding to the bingo game, wherein the number of instances is at least two;

generating, by the game server, the at least one bingo ticket for the bingo game, the generated at least one bingo ticket including the determined number of at least two instances of the special number, generating, by the game server using a random number generator, drawn numbers for the bingo game;

determining, by the game server, that the special number is represented in the drawn numbers for the bingo game; and marking, by the game server at a mobile client device using a bingo broadcaster, a bingo listener, and a bingo connection proxy, all of the at least two instances of the special number on the generated at least one bingo ticket in response to determining that the special number is represented in the drawn numbers for the bingo game, wherein:

the game server is in communication with a memory device and a cloud-based cache;

a controller is in communication with the game server and with the memory device;

a game webserver is in communication with the game server, at least one mobile client device, at least one desktop client device and the cloud-based cache;

the bingo broadcaster is in communication with the at least one desktop client device the bingo listener and the game sever; and the bingo connection proxy is in communication via a message broker with the bingo listener and with the at least one mobile client device.

* * * * *